(12) United States Patent
Masterman

(10) Patent No.: US 10,108,791 B1
(45) Date of Patent: Oct. 23, 2018

(54) AUTHENTICATION AND FRAUD DETECTION BASED ON USER BEHAVIOR

(71) Applicant: Amazon Technologies, Inc., Seattle, WA (US)

(72) Inventor: Michael Frederick Masterman, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 168 days.

(21) Appl. No.: 14/662,898

(22) Filed: Mar. 19, 2015

(51) Int. Cl.
*G06F 21/00* (2013.01)
*G06F 21/31* (2013.01)
*G06F 21/32* (2013.01)

(52) U.S. Cl.
CPC ............ *G06F 21/316* (2013.01); *G06F 21/31* (2013.01); *G06F 21/32* (2013.01)

(58) Field of Classification Search
CPC ......... G06F 21/31; G06F 21/32; G06F 21/316
See application file for complete search history.

(56) References Cited

U.S. PATENT DOCUMENTS

| | | | |
|---|---|---|---|
| 8,713,704 B2 | 4/2014 | Davis et al. | |
| 8,918,479 B2* | 12/2014 | O'Connell | G06F 21/55 709/203 |
| 2004/0083394 A1* | 4/2004 | Brebner | G06F 21/31 726/19 |
| 2005/0268107 A1* | 12/2005 | Harris | G06F 21/31 713/182 |
| 2006/0282660 A1* | 12/2006 | Varghese | G06Q 20/341 713/155 |
| 2008/0222712 A1* | 9/2008 | O'Connell | G06F 21/55 726/7 |
| 2010/0306827 A1* | 12/2010 | Esteve Balducci | G06F 21/62 726/4 |
| 2013/0054433 A1* | 2/2013 | Giard | H04L 67/22 705/34 |

(Continued)

OTHER PUBLICATIONS

Cheng Bo et al., SilentSense: Silent User Identification Via Touch and Movement Behavioral Biometrics, Sep. 30-Oct. 4, 2013, ACM, pp. 187-190.*

(Continued)

*Primary Examiner* — Kari L Schmidt
*Assistant Examiner* — Fahimeh Mohammadi
(74) *Attorney, Agent, or Firm* — Kilpatrick Townsend & Stockton LLP

(57) ABSTRACT

Methods and systems are disclosed for providing user authentication based on users' access patterns to a plurality of digital objects. The plurality of digital objects may include software applications installed on user devices or data objects within a specific application (e.g., UI objects or database objects). The access patterns can include an order of access that a user routinely takes to access such objects. Historical user behavioral information can be collected and used to generate such patterns for users. The patterns may be compared with subsequent user behavioral information to determine authenticity of subsequent users associated with the subsequent user behavioral information. For example, a subsequent order of access to digital objects can be compared with historical access patterns to determine whether there is a match. Authentication may or may not be requested based on the result of such a comparison.

16 Claims, 11 Drawing Sheets

(56) References Cited

U.S. PATENT DOCUMENTS

| | | | | |
|---|---|---|---|---|
| 2013/0104203 A1* | 4/2013 | Davis | ............... | H04L 9/3231 |
| | | | | 726/5 |
| 2015/0082441 A1* | 3/2015 | Gathala | ............... | G06F 9/541 |
| | | | | 726/25 |
| 2016/0110528 A1* | 4/2016 | Gupta | ............... | G06F 21/31 |
| | | | | 726/19 |
| 2016/0164865 A1* | 6/2016 | Speicher | ............ | H04L 63/0861 |
| | | | | 726/4 |

OTHER PUBLICATIONS

Liang Xie et al., pBMDS: A Behavior-based Malware Detection System for Cellphone Devices, Mar. 22-24, 2010, ACM, pp. 37-48.*

Li-Yu Tang et al., iLauncher: An Intelligent Launcher for Mobile Apps based on Individual Usage Patterns, Mar. 18-22, 2013, ACM, pp. 505-512.*

Mario Frank et al., Touchalytics: On the Applicability of Touchscreen Input as a Behavioral Biometric for Continuous Authentication, Oct. 16, 2012, IEEE, vol. 8, Issue: 1, pp. 136-148.*

Riva et al., "Progressive authentication: deciding when to authenticate on mobile phones", *Proceedings of the 21st USENIX conference on Security Symposium*, Berkeley, CA, USA, 16 pages (2012).

* cited by examiner

AUTHENTICATION AND FRAUD DETECTION BASED ON USER BEHAVIOR

BACKGROUND

The rapid advancement in computer technologies and consumer devices permit people to access a wide variety of web-based applications and services such as shopping, banking, entertainment, and the like. Absent face-to-face interaction, digital user authentication is often required to provide security and privacy. However, frequent authentication prompts can interrupt a user's interaction with an application or device creating friction in the user experience.

BRIEF DESCRIPTION OF THE DRAWINGS

Various embodiments in accordance with the present disclosure will be described with reference to the drawings, in which.

DETAILED DESCRIPTION

Figure 1:
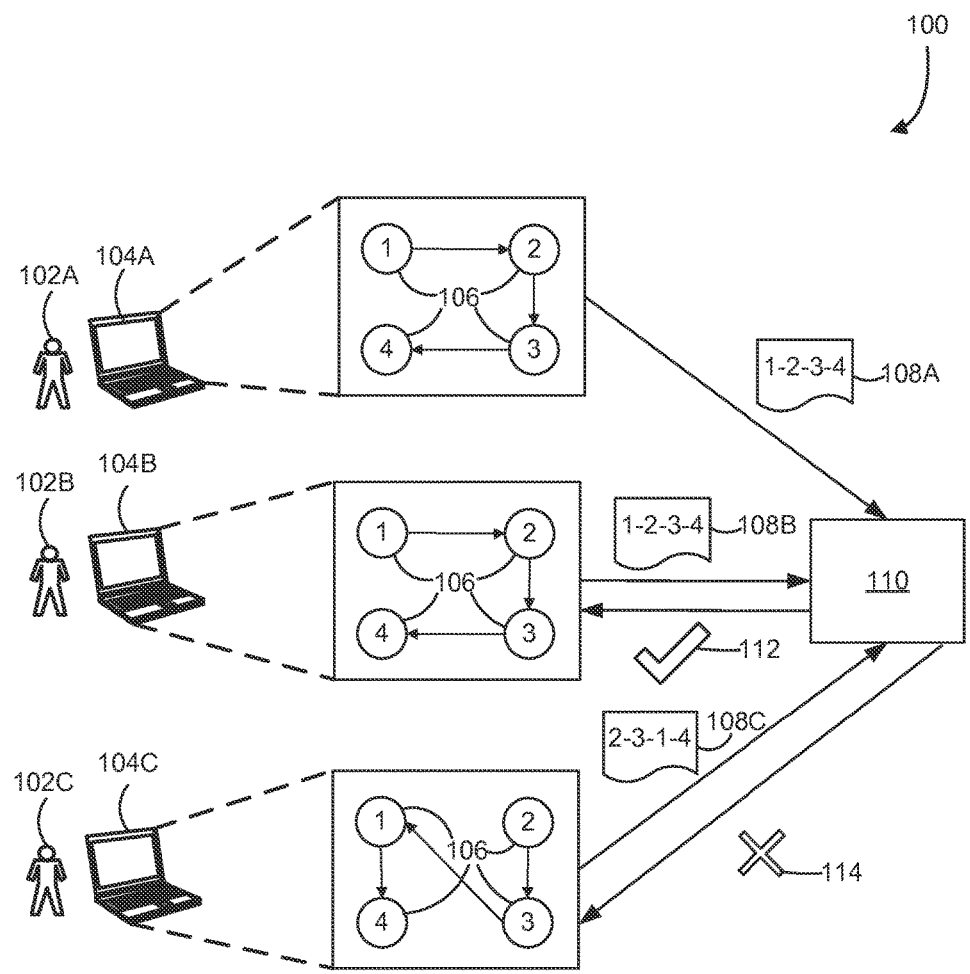
FIG. 1 illustrates an example computing environment for implementing behavior-based authentication, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques are provided for providing authentication based on user behavioral information so as to ensure security while reducing unnecessary user authentication. In particular, historical user behavioral information associated with a first user or a first user account may be collected based on the user's previous interactions with one or more applications. The historical user behavioral information may be analyzed to generate one or more patterns associated with the user. The patterns may be associated with specific applications, devices, time periods, geographical locations, and the like. Subsequently-collected user behavioral information for a second user (e.g., during a later application session or the same application session) may be compared with the existing patterns to determine a confidence level that the second user is the first user. Based on the confidence level, an appropriate course of action may be determined. The course of action may include actions as well as inactions. For instance, actions may include prompting a user for authentication credentials. Prompting a user for authentication credentials may include providing an authentication page or screen to a user device.

The action may include requiring authentication with certain predetermined characteristics with respect to complexity, strength, frequency, scope (e.g., amount and/or type of data objects protected by the authentication), and the like. For instance, if the confidence level is high, then no authentication may be required. Alternatively, a relatively weak method of authentication (e.g., a simple username/password authentication form) may be required. When the confidence level is high, authentication may be requested at a relatively low frequency (or the expiration time for re-authentication may be extended). Additionally, the scope of the authentication may be reduced such that authentication is only required for a smaller set of data or applications (e.g., the more sensitive portions). On the other hand, if the confidence level is low, then a relatively stronger or more secure form of authentication may be required (e.g., three-factor authentication). Furthermore, authentication may be requested at a relatively high frequency (or the expiration time for re-authentication may be shortened) and with a larger scope (e.g., authentication may apply to even the less sensitive data, applications or other objects) when the confidence level is low.

In some embodiments, the collected user behavioral information includes order of access information with respect to a plurality of digital objects. The digital objects can include software applications installed on a user device, features associated with an application, data objects associated with an application such as user interface (UI) objects, business objects, and database objects stored in a data store, digital objects contained in a network document (e.g., text, images, videos, links, files, or scripts) or a network resource (e.g., a website), or any other suitable digital objects that may be made accessible to a user. In an example, the data objects can include files or portions of a file. In another example, the data objects can represent different storage locations within a storage device (e.g., hard disk drive, solid state device), a storage server, a group or cluster of storage devices (e.g., a rack of hard disk drives), a data center, or the like. Examples of storage locations can include sectors on a hard disk drive, volumes on a storage server, slots in a storage rack, and the like. Accessing the digital objects may include performing reading and writing operations with respect to the digital objects (e.g., creating, reading, modifying, and/or deleting data objects), launching or closing applications installed on a device, recording or playing back a media file, and the like. In various embodiments, the digital objects can be permanent, semi-permanent, or temporary. An order of access to the digital objects can refer to an order in which the digital objects are accessed by a user. For example, an order of access may include a series of steps that a user takes or a series of UI controls or web pages that a user traverses during the use of an application. The order of access may reflect a partial or complete order among two or more of the digital objects. In general, order of access information associated with a plurality of digital objects can additionally include a type of access (e.g., read or write), frequency of access, duration of access, time of the access, or other information associated with the access to one or more of the plurality of the digital objects. A first order of access may be different from a second order of access because the first order of access or the second order of access includes at least one object that is not included in the other order of access. Alternatively, a first order of access may be different from a second order of access even though both contain the same objects but in different orders.

In an embodiment, the user behavioral information can indicate order of access information with respect to user interactions with or access to a plurality of applications or data objects installed on or stored on a specific user device. Over a period of time, a first set of behavioral information indicating a first order of the user access to the plurality of applications for the user device may be collected and used as historical behavioral information. The historical behavioral information can be associated with a user, user account, user identifier, user device, or the like. In some embodiments, the historical behavioral information may be associated with one or more user interactions with or access to the device (e.g., while a user is logged in or otherwise identified). Subsequent access to the plurality of applications may be recorded in a second set of behavioral information. The second set of behavioral information may be associated with one or more current or ongoing user interactions with or access to the device on which the plurality of applications are installed. The second set of behavioral information may indicate a second order of user access to the plurality of applications on the user device. The previous user interactions and the subsequent interactions may span one or more time periods. The historical behavioral information (and/or patterns derived therefrom) may be compared with the current behavioral information to determine a confidence level or score that the subsequent user interactions with or access to the user device are indeed associated with the intended user, user account, or user identifier. Based on the confidence level, an appropriate strategy or course of action with respect to authentication may be determined. For instance, a user may interact with a user device to access applications or data thereon for five minutes, step away from the device for three minutes and come back to interact with the device thereafter. The historical behavioral information may capture the user's interactions with the device during the first five minutes. The current behavioral information may capture the user's interaction with the device after the user comes back to the device. The current behavioral information may be compared with the historical user behavioral information to determine an authentication strategy (e.g., whether to require additional authentication and/or whether to increase/decrease authentication frequency or authentication strength). Such determination may be required based on the length of time between user activities (e.g., the period of time when the user steps away from the device), the type of data objects and/or device applications to be accessed by the user, the type of user device, and/or the environment in which the device is located (e.g., private or public place, time of day).

As an example of the above embodiment, consider a user's use of applications or features on a mobile device such as a smartphone or a tablet device. A plurality of mobile applications may be installed on the mobile device. Historical behavioral information about the user's use of the mobile applications may be collected (e.g., time when the applications are launched and/or closed). Such historical behavioral information may reflect a certain pattern with which the user accesses the plurality of mobile applications (e.g., an order of access to the applications and a duration or frequency of such access). For example, a user may typically access some of the mobile applications or functionalities of the mobile device in a particular order over a period of time (e.g., in the morning). For instance, the user may first access a weather application to check local weather, then use an email application to check email messages, and finally access a social media application. Such access to mobile applications may be recorded and analyzed according to methods discussed herein so as to generate one or more patterns associated with the user or user device. Subsequent behavioral information with respect to the user device may be collected that includes a pattern of access to the functionalities or applications specific to the user device. For instance, the new behavioral information may include an order in which the functionalities and applications are ordered by a user. Such new behavioral information may be compared with the previously-collected historical behavioral information including the patterns derived therefrom to determine whether the user accessing the user device is the intended or expected user. Examples of such deviations may include accessing an application that is not typically accessed in previous user interactions with the device, accesses applications in an unusual order (e.g., starting with accessing a sensitive application such as a banking application or sensitive data). In some embodiments, one or more confidence levels or scores may be generated based on a match or comparison between the new behavioral information and the historical patterns. In particular, the order of access information may be compared. In an example, multiple confidence levels may be calculated for each of some or all of the historical patterns. The multiple confidence levels may be combined with respective weights that indicate the relative importance of the patterns to generate an overall confidence level. The confidence level may indicate a likelihood that the later user is the intended user. In this case, a higher confidence level indicates a closer match between the new behavioral information and the historical patterns. A deviation from an existing historical pattern (e.g., access pattern or order of access pattern) may cause a lower confidence level to be generated for the respective pattern and/or a lower overall confidence level. Alternatively, the confidence level may indicate a likelihood that there is a fraud by comparing the new behavioral information with known, historical patterns of fraud. In this case, a lower confidence level, i.e., a low likelihood of fraud, indicates a closer match between the new behavioral information and the historical patterns of the intended or expected user.

In another embodiment, the user behavioral information can indicate order of access information with respect to user interactions with or access to data objects specific to a particular application. During one or more previous user interactions with the application, a first set of behavioral information indicating a first order of user access to content data specific to the application can be collected and used as historical behavioral information. The historical behavioral information can be associated with a user, user account, user identifier, user device, and the like. Subsequently, during one or more subsequent user interactions with the same application, a second set of behavioral information indicating a second order of user access can be collected. The previous user interactions and the subsequent user interactions may span one or more application sessions. For instance, at least a subset of the first set of behavioral information may be collected from a first application session and at least a subset of the second set of behavioral information may be collected from a second, different application session. Alternatively, at least a subset of the first set of behavioral information and at least a subset of the second set of behavioral information may be collected from the same application session. For instance, user interaction with the application during a first portion of an application session (e.g., first five minutes) may be recorded as the first set of behavioral information and user interaction with the application during a second portion of the application session (e.g., a two-minute period after the first five minutes) may be recorded as the second set of behavioral information. There may or may not be a time interval between the two portions. The historical behavioral information (and/or patterns derived therefrom) may be compared with the current behavioral information to determine a confidence level or score that the subsequent user interactions are indeed associated with the intended user, user account, or user identifier. Based on the confidence level, an appropriate strategy with respect to authentication may be determined. For instance, a user may use the device to access an application for five minutes, stay away from the application for three minutes, and resume the application thereafter. The historical behavioral information may capture the user's interactions with the application during the first five minutes. The current behavioral information may capture the user's interactions with the application after the user resumes the application. The current behavioral information may be compared with the historical user behavioral information to determine an authentication strategy (e.g., whether to require additional authentication and/or whether to increase/decrease authentication frequency or authentication strength). Such determination may be required based on the length of time between user activities (e.g., the period of time when the user steps away from the device), the type of data objects to be accessed by the user, the feature and/or functionality of the application to be accessed by the user, the type of user device, and/or the environment in which the device is located (e.g., private or public place, time of day).

As an example of the above embodiment, consider a user's use of a shopping application. Historical behavioral information about the user's use of the shopping application may be collected. The information may include read/write operations to data objects, UI events such as selection of UI elements, mouse-over of UI elements, providing input using UI elements, navigation events such as page scrolling, page forward or backward, communications events such as client requests or server responses, and the like. Such historical behavioral information may reflect a certain pattern with which the user access the content data specific to the shopping application. The user access may be via a user interface provided by the shopping application. For instance, the user may routinely access data objects (e.g., links) in a "Recommendations" section before accessing data objects (e.g., links to product web pages) in a "Best Sellers" section after logging in to the user account. As another example, a user may enter search terms in a particular order in a search field in the user interface. The order may be based on certain user-preferred syntax. For instance, when using the shopping application to shop for an item, the user may typically enter a manufacturer name, followed by a color, followed by a description of the item to be searched (e.g., "Toyota black car"). In some cases, the user may enter adjectives before nouns or vice versa. Access to data objects specific to the application may be recorded and analyzed according to methods discussed herein so as to generate one or more patterns associated with the user, user account, or user identifier and/or with the specific application. During a later application session, new behavioral information may be collected that indicates a pattern of access to content data specific to the shopping application. For instance, the new behavioral information may include an order in which the user associated with later application session accesses data objects in the user interface provided by the shopping application. Such new behavioral information may be compared with the previously-collected historical behavioral information including the patterns derived therefrom to determine whether the user accessing the later application session is the intended user associated with the previous sessions. If the new behavioral information substantially matches the historical behavioral information (including the patterns derived therefrom), a relatively high confidence level may be obtained indicating that the later user is more likely to be the intended user. Otherwise, if the new behavioral information does not substantially match the historical behavioral information (including the patterns derived therefrom), a relatively lower confidence level may be obtained indicating that the later user is less likely to be the intended user. In some embodiments, one or more confidence levels or scores may be generated based on a match or comparison between the new behavioral information and the historical patterns such as discussed above. In particular, the order of access information may be compared.

In some embodiments, a user's behavioral pattern with respect to the digital objects described above may vary under different circumstances. That is, the same user may exhibit different behaviors under different circumstances. For instance, an order of access to a plurality of application-specific content data objects or a plurality of mobile applications stored on a user device may vary based on the time of the access (e.g., time of a day or year), the type of device used to access the content data, the location of the device, and the like. To account for such difference in behavioral patterns for the same users, context information that describe the context or environment in which user behaviors take place may be recorded along with the user behavioral information. The context information may be pertinent to a user, a device operated by a user, or both. Examples of context information can include temporal information (e.g., time, frequency, duration), location information (e.g., geographical location), device information (e.g., type of device, hardware/software configurations, spatial disposition, movement information), environment information (e.g., weather, temperature, humidity, noise level, interference, relationship to surrounding objects), and the like.

In some embodiments, the context information may be correlated with the user behavioral information so as to categorize user behavioral information including behavioral patterns based on different context categories. In various embodiments, the behavioral information described herein may be categorized according to one, two, three, or more types of context information. For example, the behavioral information can be categorized by time, location, device type, and/or any combination thereof. When a new set of behavioral information is captured, context information associated with the new behavioral information may also be captured and used to select a subset of the historical behavioral information (including the behavioral patterns) that corresponds with the new context information. In an embodiment, historical behavioral information (including the historical behavioral patterns derived therefrom) may be categorized according different time periods within a day, a week, a month, a quarter, a year, and any other suitable length of time. If the current behavioral information is associated with a particular time period, the subset of the historical behavioral information (including the historical behavioral patterns derived therefrom) associated with that particular time period may be selected and used to compare with the current behavioral information. As an example, a user's behavior with respect to a shopping application around Christmas time may be different than that during the rest of the year. As another example, a user's behavior during a special event (e.g., major sports event) may be different than that at other times. In another embodiment, the behavioral information may be categorized according to both time and device type. In yet another embodiment, the behavioral information may be categorized according to time, device type, and location information. In another embodiment, context information such as discussed above may be included in the user behavioral information and used to generate behavioral patterns.

FIG. 1 illustrates an example computing environment 100 for implementing behavior-based authentication, in accordance with embodiments. A first user 102A may operate a first user computing device 104A to access a plurality of digital objects 106. In various embodiments, the plurality of digital objects may include software applications installed on a user device, features associated with an application, data objects associated with an application, data objects stored in a data store, user interface (UI) objects, digital objects contained in a network document (e.g., text, images, videos, links, files, or scripts) or a network resource (e.g., a website), or any other suitable digital objects that may be accessible to a user. The digital objects 106 that are accessed may reside on the user device 104A (e.g., applications installed on the user device or data stored on the user device). Alternatively or additionally, the digital objects 106 may be located on a remote device but made accessible via user device 104A (e.g., database objects stored on a data server or remote applications executing on an application server). Accessing the digital objects may include reading and writing operations with respect to the digital objects (e.g., creating, reading, modifying, and/or deleting data objects), launching or closing operations (e.g., launching or closing of applications installed on a device), recording and playback operations (e.g., recording or playback of a multimedia file), and the like.

Behavioral information 108A related to the access to the plurality of digital objects 106 by the user 102A may be captured. The behavioral information 108A may include an order in which the plurality of digital objects 106 are accessed by the user 102A. For instance, in the illustrative example, the user 102A accesses object 1, then object 2, then object 3, and finally object 4. In other words, the order of access is "1-2-3-4." Additional behavioral information captured during the user's interaction with the digital objects 106 may include information related to the user input (e.g., search terms entered or order of the search terms entered), frequency and/or duration associated with user operations (e.g., read/write operations). In some cases, an order of access to a data object includes an order of user-provided input to the data object. For instance, the data object may be a search field configured to receive user-provided search terms and an order of user access may include an order of the search terms entered into the search field. Furthermore, context information (not shown) associated with the behavioral information may also be captured such as timing information, location information, device information, and the like. The user behavioral and/or context information can be captured as a user accesses or otherwise interacts with the objects 106, for example, on a continuous and/or periodic basis (e.g., every 0.1 second or every 2 seconds). The information may be collected by a process running on the user device 104A, a remote process running on a different device, or a combination of both.

The behavioral information 108A including order of access information may be provided to a behavior-based authentication service 110. Aspects of the authentication service 110 may be implemented by a service provider that provides access to the digital objects 106, a user device such as 104A, B, or C, and/or a third-party service provider. The service 110 may be configured to process the behavioral information, context information, and other related information associated with one or more users, groups of users, applications, devices, and the like so as to generate patterns usable for authenticating users and/or devices based on subsequent user behavioral information. For instance, the authentication service 110 may be configured to receive subsequent user behavioral information 108B associated with a second user 102B operating a second user device 104B associated with the user account or user identifier of the first user 102A and/or first user device 104A, and user behavioral information 108C associated with a third user 102C operating a third user device 104C associated with the user account or user identifier of the first user 102A and/or first user device 104A, as well as any other related information (not shown) such as context information where appropriate. The subsequent behavioral information 108B and 108C may include order of access information with respect to the digital objects 106. For instance, the behavioral information 108B may include an order of access "1-2-3-4" in which the second user 102B accesses the digital objects 106 via the second device 104B. The behavioral information 108C for may include an order of access "2-3-1-4" in which the third user 102C' accesses the digital objects 106 via the second device 104C.

The subsequent behavioral information 108B and 108C as well as related context information may be compared with the previously-collected or historical behavioral information 108A and/or the patterns derived therefrom to determine instructions 112 and 114 for the user device 104B and 104C, respectively. In some embodiments, the instructions for subsequent actions may be generated based on a confidence level. The confidence level may be determined based on the comparison between historical behavioral information 108A (and/or patterns derived therefrom) and the subsequent behavioral information 108B or 108C. The confidence level may indicate a likelihood that the subsequent user 102B or 102C and/or the subsequent user device 104B or 104C correspond to the same previous user 102A and/or user device 104A associated with the historical behavioral information 108A. The confidence level may reflect how closely the historical behavioral information matches the subsequent behavioral information. A relatively higher confidence level may be generated for a close match; and a relatively low confidence level may be generated for a less close match. In various embodiments, the confidence level may be represented using numeric values, alphanumeric characters, binaries, or any other suitable representation.

In an embodiment, the confidence level is generated based at least in part on a comparison between an order of user access indicated by the historical behavioral information 108A and an order of user access indicated by a subsequent behavioral information 108B or 108C. A relatively high confidence level may be generated if there is a close match between the two orders of access; and vice versa. For example, a high confidence level may be generated based on the behavioral information 108B associated with the second user 102B and/or second user device 104B because the order of access "1-2-3-4" is the same as the order of access for the first user 102A and/or first user device 104A. On the other hand, a relatively low confidence level may be generated if there is not a close match between the two orders of access. For example, a low confidence level may be generated based on the behavioral information 108C associated with the third user 102C and/or third user device 104C because the order of access "2-3-1-4" does not match the order of access ("1-2-3-4") for the first user 102A and/or first user device 104A.

Based on the confidence level, authentication instructions 112, 114 may be provided. In an embodiment, the authentication instructions may specify whether further authentication is required from the user, for example, to access data, features, applications, devices, or any other resources. For instance, in the case where the confidence level is high (e.g., for the second user 102B), the instructions 112 may indicate that no authentication is to be requested or that authentication is to be requested at a lower frequency. In some cases, the instructions 112 may indicate that a relatively simple and/or weaker form of authentication is to be requested or that the authentication is only to be requested to protect a smaller set of data (e.g., the most sensitive data). Otherwise, in the case where the confidence level is determined to be low (e.g., for the second user 102C), the instructions 114 may indicate that authentication is requested or that authentication is to be requested at a higher frequency. In some cases, the instructions 114 may indicate that a relatively complex and/or stronger form of authentication is to be requested or that the authentication is be requested to protect a larger set of data (e.g., including the less sensitive data). If authentication is required, the instructions may specify a particular authentication method to be used including one or more parameters or data objects associated with the authentication method. In some cases, the instructions may include files (e.g., web pages) and/or data objects used to present an authentication interface to the user. The authentication method may be selected from a plurality of available authentication methods based on the confidence level and/or other factors such as the type of data to be accessed, access control properties (e.g., read/write privileges) associated with a user, device information (e.g., input method, screen resolution, or device-specific security/authentication mechanisms such as a finger print reader), and environment factors (e.g., proximity to other users or devices or network environment).

Figure 2:
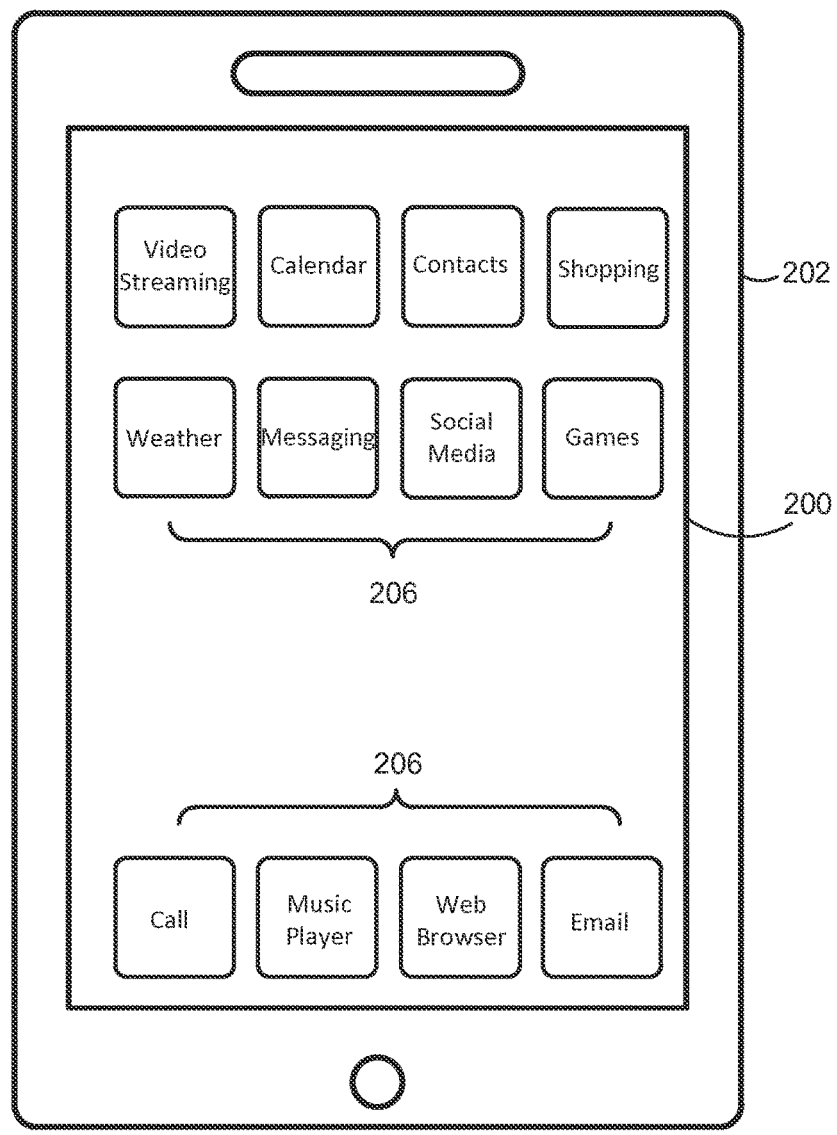
FIG. 2 illustrates an example user interface provided by a user device for interaction with a plurality of applications installed on the user device, in accordance with embodiments.

As discussed above, the techniques provided herein can be used to authenticate users based on the users' interaction with a plurality of digital objects. The digital objects can include applications installed on a user device, data objects within a specific application, or any other suitable objects. The users' interaction with the plurality of digital objects can be performed via any suitable user interface. FIG. 2 illustrates an example user interface 200 provided by a user device 202 for interaction with a plurality of applications installed on the user device 202, in accordance with embodiments. Examples of software applications installed on a user device may include document processing applications (e.g., word processing application, spreadsheet application, presentation application, or diagramming application), communication applications (e.g., email application, messaging application), data management applications (e.g., contact application, calendar application), content accessing applications (e.g., web browsers or media players), entertainment applications (e.g., games), financial applications (e.g., trading or banking application), social media applications, picture or media sharing applications, location-based applications (e.g., GPS mapping), retail applications (e.g., shopping or order tracking applications), food and drinks related applications, travel-related applications (e.g., price search applications, booking applications, or airline-specific applications), medical applications (e.g., personal health applications), and the like. The software applications can be configured to execute on a variety of user devices 202 such as desktops, laptops, smartphones, tablet devices, smart TVs, game consoles, setup boxes, and the like. For instance, the software applications can include mobile applications (hereinafter "mobile apps") configured to run on smartphones, tablet devices, or other mobile devices.

The user interface 200 may comprise a plurality of icons 206 corresponding to a plurality of applications. A user may access or launch an application by touching, clicking on, or otherwise selecting the corresponding icon 206. In some embodiments, the icons 206 may also include folders, directories, or other structures containing icons for launching the applications. The user may also interact with the application once launched or close the application. In various embodiments, the user input may be provided via any suitable input mechanism such as a touchscreen, mouse, keyboard, stylus, joystick, button, switch, and the like.

In some cases, a user may routinely access to a plurality of applications on a particular user device in a particular order. The order of access to the plurality of applications may be represented by the order in which the applications are launched by the user, for example, by selecting (e.g., double-clicking or touching) the corresponding icons 206 displayed on the user interface 200 of the user device 202. In some embodiments, the order of access of the applications may be recorded by a process running on the user device 202. In some other embodiments, the order of access may be recorded by a remote process running on a remote device (e.g., a remote control device or a remote server). The order of access, along with any other suitable user behavioral information, may be used to subsequently authenticate the users of the user device 202 using the methods described herein.

In some embodiments, aspects related to the recording of the access order information may be determined by events based on time, user actions, and the like. Such aspects may include start time, end time, duration, frequency, types of information recorded, and the like. For instance, the recording of the access orders may be triggered when a user turns on or otherwise activates the user device and end when the user turns off or otherwise deactivates the user device. The recording of the access orders may also be based on a predetermined time schedule. The time schedule may or may not be determined based on the user's profile, habits, preferences, activities, and the like. For instance, the recording may be performed more (e.g., higher frequency and/or longer duration) during the daytime when most users are awake than at night when most users are asleep.

In some embodiments, aspects related to the recording of the access order information may be determined by a state of the user device. The state of the user device may include its geographic location, movement, spatial orientation, operating status (e.g., on/off, power saving mode, battery status), and the like. For instance, the recording may be done at lower frequency and/or shorter duration when the user device is at a private place such as home than when the user device is at a public or semi-public place such as a workplace, a restaurant, or an airport. In an embodiment, the recording may be more limited when the user device is determined to be moving above a predetermined speed (e.g., 45 miles per hour) and/or acceleration. For example, the user may be engaged in driving, taking off, landing, other activities with a low likelihood of accessing the user device. In another example, the contrary may be true and the recording may be less restricted when the user device is determined to be moving above a predetermined speed (e.g., 100 miles per hour) and/or below a predetermined acceleration. For example, the user may be traveling on a steady train or airplane where the user is more likely to access the user device. In an embodiment, the recording may be more limited when the user device's power is low and less restricted when the power is high.

In some embodiments, aspects related to the recording of the access order information may be based on information obtained from the user device and/or from external sources. Data extracted from the user device may include user or application data stored on the user device such as user profile data, contact data from a contact application, calendar data from a calendar application, route information from a mapping application, and the like. Data extracted from the user device may also include sensor data obtained by sensors associated with the user device such as location sensor (e.g., GPS sensor, compass, or magnetometer), movement sensors (e.g., accelerometer, gyroscope, or inertial sensors), image sensors (e.g., camera), audio sensor (e.g., microphone), proximity sensor (e.g., infrared sensor), and the like. In some embodiments, aspects associated with the acquisition of user behavioral information may be based on existing user behavioral information. External data sources may include devices operatively connected to the user device with a wired or wireless connection and/or a network such as a data store, remote control, server, cloud-based service, and the like.

Figure 3:
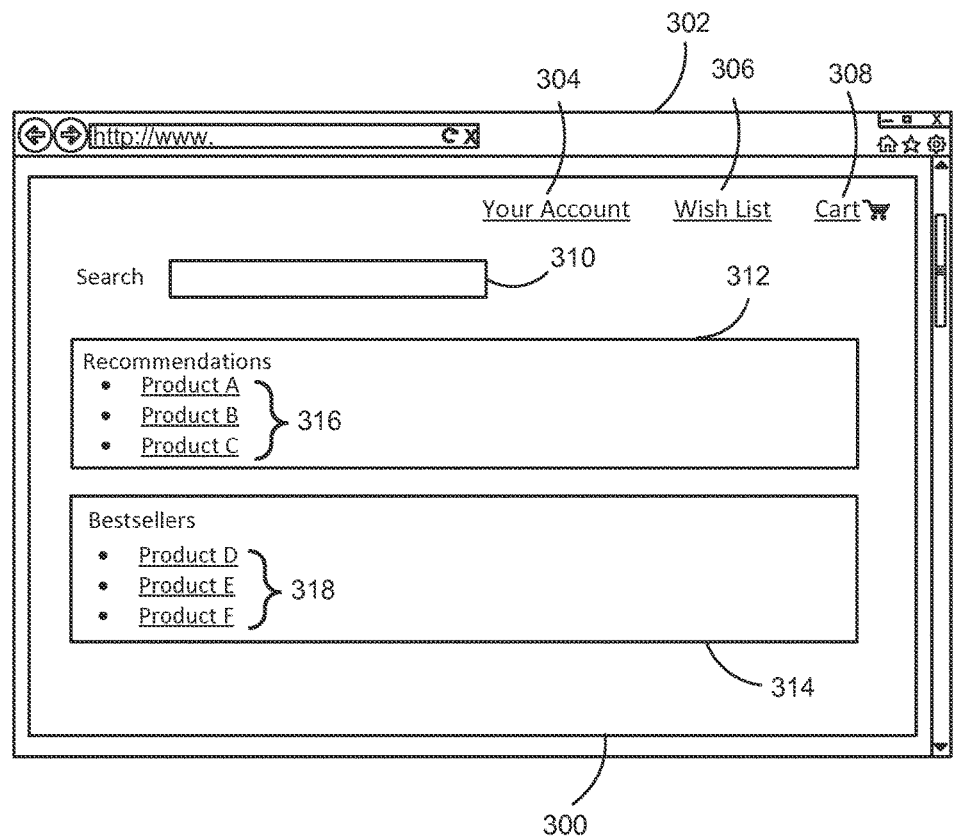
FIG. 3 illustrates an example user interface provided by an application for interaction with a plurality of data objects of the application, in accordance with embodiments.

FIG. 3 illustrates an example user interface 300 provided by an application for interaction with a plurality of data objects of the application, in accordance with embodiments. The application may be include a local application running on a user device, a remote application running on a remote server, or a combination of both. Examples of the application may include those discussed in FIG. 2. In an embodiment, the user interface 300 may be rendered in a browser window 302 displayed on a user device to access a web-based application running remotely on a remote server. As illustrated by FIG. 2, the web-based application may be a shopping application that allows a user to view and purchase goods online.

The user interface 300 may allow a user to access a plurality of data objects associated with the application. Accessing the data objects can include creating, reading, writing, or deleting the data objects. The plurality of data objects may include any user interface (UI) elements or controls such as windows, menus, tabs, icons, buttons, lists, check boxes, text boxes or text fields, dialog boxes, links, and the like. As an example, FIG. 3 shows some example UI elements that may be associated with a user interface 300 for a shopping application. The user interface 300 may include a plurality of links 304, 306, 308 for accessing account information, a wish list, and a shopping cart, respectively. The user interface 300 may also include a text box 310 to receive user-provided search terms. The user interface 300 may also include a recommendations section 312 for displaying information related to a plurality of recommended products such as links 316 to these recommended products. The user interface 300 may also include a bestsellers section 314 for displaying information related to a plurality of best-selling products such as links 318 to these best-selling products. In various embodiments, a user's access to or interaction with the UI elements may include pointing, selecting, providing input, drag-and-drop, scrolling, and the like.

Besides UI objects, the plurality of data objects accessible by a user can also include business objects, database objects, network objects, and other types of objects associated with any suitable layer of abstraction for the application. Examples of the data objects can include files (e.g., HTML or XML files), scripts (e.g., JavaScripts or VBScripts), services (e.g., web services), variables, classes, methods, database tables, fields, attributes, values, and the like. Such data objects may be accessible indirectly via the user interface 300. In some embodiments, the access to the non-UI objects may be caused by a user's interaction with the UI objects. For instance, a user's execution of a search term in a search box may trigger database query operations on one or more database objects stored in a data store.

The order of access to the data objects of the application can reflect the steps that a user typically or routinely takes to interact with the application and can be used to authenticate the users of the application. For instance, a user may access UI objects (and/or non-UI data objects) for a specific application in a particular order. For instance, upon logging into a shopping application, a user may routinely access recommendation links 316 in the recommendations section 312 before selecting the wish list link 306, or select the shopping cart link 308 before selecting the account link 304. A user may perform searches using the search box 310 after viewing items 318 listed in the bestsellers section 314. A user may provide user input such as search terms in a particular order (e.g., color before brand name) or format (e.g., searching books by author instead of by title, using all capital letters or a certain language for search terms). In some embodiments, a deviation from such routine access order may indicate that a current user accessing the application may not be the intended or expected user.

In some embodiments, the access order information may be recorded by a process running on the user device, a process running on a remote server, or by a combination of both. For instance, the access to UI elements rendered on the user device may be recorded by a client-side script (e.g., JavaScript) whereas access to backend objects may be recorded by a server-side script. In some embodiments, aspects related to the recording of the access order information such as the start time, end time, duration, frequency, types of information recorded, and the like, may be determined based on time, user profile, user actions, or other configurable parameters such as discussed in FIG. 2. In some embodiments, the access order information may be specific to the application that is being accessed, for example, based on the specific content that is provided by the application and/or the specific UI layout for the application. In some other embodiments, the access order information that is captured for a first application may be used as or used to generate access patterns for a second application. The first application and the second application may or may not share certain similarities such as similar UI layouts, locale settings, application suites, servers or databases, service providers, and the like.

Figure 4:
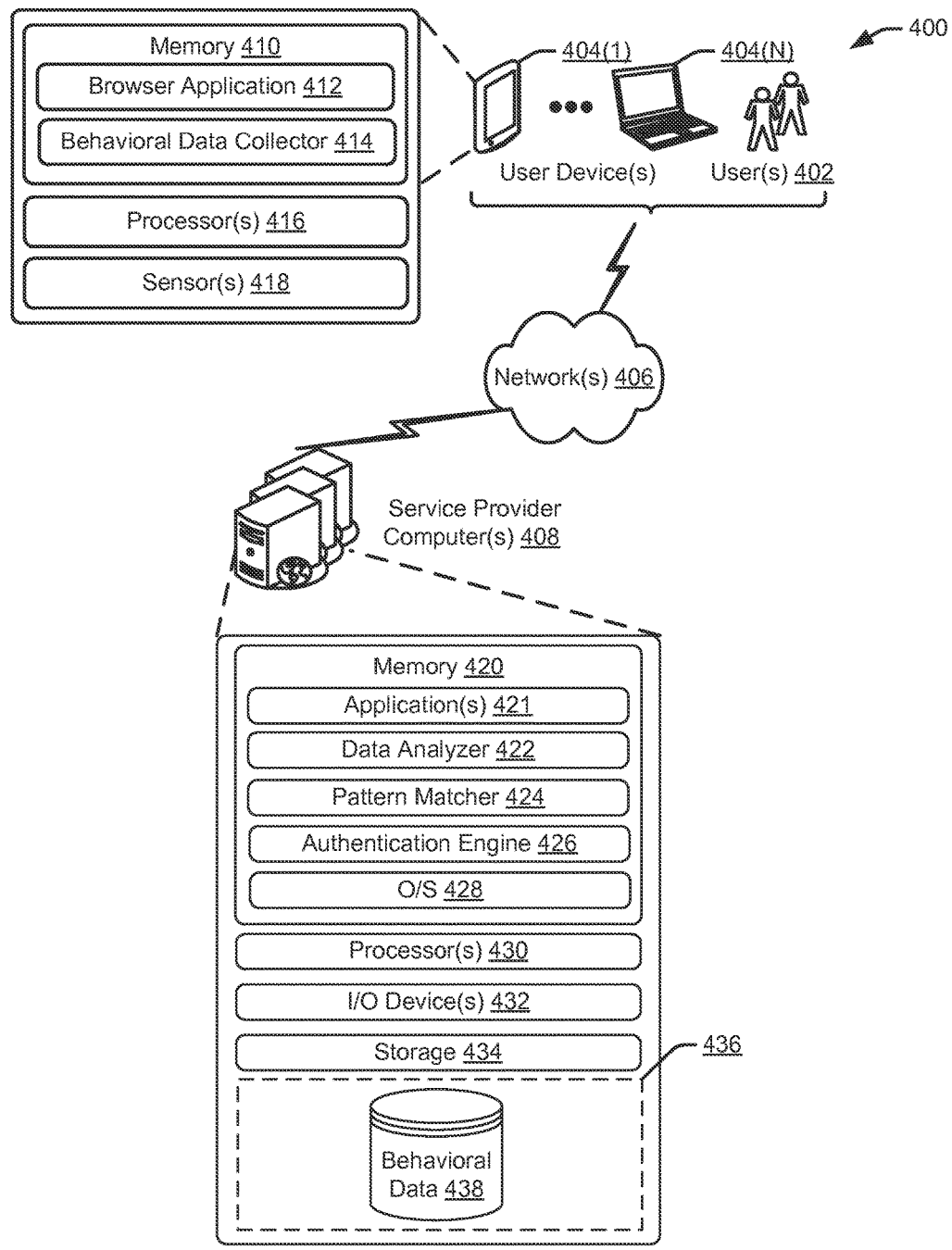
FIG. 4 illustrates an example system for implementing behavior-based authentication, in accordance with embodiments.

FIG. 4 illustrates an example system 400 for implementing behavior-based authentication, in accordance with embodiments. As illustrated, one or more user computing devices 404(1)-(N) (collectively, user devices 404) may be operably connected to one or more service provider computers 408 via one or more networks 406 to utilize the features of behavior-based authentication discussed herein. The one or more user devices 404, operable by one or more users 402, can be configured to allow users 402 to view and interact with applications local to the user devices 404 and/or remote applications 421 provided by the service provider computers 408. The user devices 404 can also be configured to collect behavioral data of the users 402 related to the users' interaction with the applications and/or user devices including order of access information discussed herein. The service provider computers 408 may be configured to analyze the behavioral data and authenticate the users based on the behavioral data.

The user devices 404 can include desktops, laptops, tablets, smartphones, mobile phones, personal digital assistants (PDAs), smart TVs, game consoles, wearable devices, or any other network-enabled devices capable of displaying data. In one illustrative configuration, a user computing device 404 may include at least one memory 410 and one or more processing units or processor(s) 416. The processor(s) 416 may be implemented as appropriate in hardware, computer-executable instructions, firmware, or combinations thereof. Computer-executable instruction or firmware implementations of the processor(s) 416 may include computer-executable or machine-executable instructions written in any suitable programming language to perform the various functions described herein.

The memory 410 may store program instructions that are loadable and executable on the processor(s) 416, as well as data generated during the execution of these programs. Depending on the configuration and type of user device 404, the memory 410 may be volatile (such as random access memory (RAM)) and/or non-volatile (such as read-only memory (ROM), flash memory, etc.). The user device 404 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 410 may include multiple different types of memory, such as static random access memory (SRAM), dynamic random access memory (DRAM), or ROM. The one or more user devices 404 may also contain communication modules that allow the user devices to communicate with a local or remote data store, another computing device or server, user terminals and/or other devices on the networks 406. The user devices 404 may also include input device(s) for users to provide input such as keyboard, mouse, stylus, joystick, microphone, touchpad or touch screen, and the like. The user devices 404 may also include output or display device(s) for presenting information to the users such as a touchscreen, projector, LCD screen, plasma screen, LED or OLED screen, television, or monitor.

The user device 404 may optionally include or be operably connected to one or more sensors 418. The sensors may be configured to detect a position, movement, orientation, pattern, or other characteristics of the user device 404 and/or other objects surrounding the user device 404 (including a user 402 operating the user device). Examples of such sensors may include visual sensors (e.g., cameras), inertial sensors (e.g., gyroscope or accelerometers), motion sensors, proximity sensors, position sensors (e.g., global positioning system (GPS) sensor), and the like. Sensor data obtained from such sensors may be collected as part of user behavioral data or context information to improve accuracy and/or relevancy of the data collection. For instance, a camera may be used to track the gaze or eye movement of a user. Such data may be used to determine an order in which objects on a screen are accessed by a user. As another example, an input tracking device may be used to track a series of user interactions with the application via an input device (e.g., mouse, keyboard, remote controller, cameras for gesture recognition, or microphone) so as to determine an order of access with respect to data on a user device. As another example, sensor data such as obtained from a microphone, camera, location sensor, proximity sensor, and the like, may be used to provide information related to the context or environment where the user behaviors take place.

Turning to the components of the memory 410 in more detail, the memory 410 may include an operating system and one or more application programs, executable code, routines, scripts, or services for implementing the performance measurement functionalities disclosed herein. Browser application 412 can include browser control or native application and can be configured to retrieve, present, and traverse information resources such as network documents (e.g., web pages), images, videos, and the like. In general, the browser application 412 can allow a user to interact with any type of network resources (e.g., websites) including social networking sites, electronic retailers, informational sites, blog sites, search engine sites, news and entertainment sites, and so forth. In some embodiments, the browser application 412 can be used to access functionalities of remote applications or services provided by remote servers such as service provider computers 408. The described techniques can similarly be implemented outside of the browser application 412, such as with other applications running on the user device 404.

The memory 410 may also include instructions for a behavioral data collector 414, which is configured to collect behavioral data related to a user's interaction with a plurality of digital objects accessible via the user device 404. The digital objects may include applications running on the user device 404, data objects related within a specific application accessible via the user interface (e.g., displayed in a browser window provided by the browser application 412), or the like. In some embodiments, the instructions for the behavioral data collector 414 may be written using JavaScript, VBScript, Python or any other language that is supported by the browser application 412. The instructions for the behavioral data collector 414, when executed by the browser application 412, may cause the collection of behavioral data such as described herein. In alternative embodiments, the behavioral data collector 414 may be implemented as a separate process that does not require the browser application to run. In illustrative embodiments, the behavioral data collector 414 is configured to record client-side behavioral data. Alternatively or additionally, a backend behavioral data collector may be used to record backend behavioral data such as an order of access of database objects stored in a backend server or data store. In various embodiments, the instructions for the behavioral data collector 414 may be provided by one or more computer-readable media (e.g., CD, USB stick, removable hard drive), service provider computers 408, third-party content providers, manufacturers or distributors of the user devices 404, or any other suitable providers.

The memory 410 may also be configured to store downloaded content data (e.g., network documents, images, videos, or other digital assets) such as retrieved by the browser application 412, collected user behavioral data such as measured by the behavioral data collector 414, behavioral patterns generated based on the behavioral data, context associated with the behavioral data, user or device information such as user credentials (e.g., user IDs, passwords), device ID, cookies, IP address, and the like. Additionally, the memory 410 may store sensor data obtained from one or more sensors described above.

In some examples, the networks 406 may include any one or a combination of many different types of networks, such as cable networks, the Internet, wireless networks, cellular networks and other private and/or public networks. While the illustrated example represents the users 402 utilizing the browser application 412 over the networks 406, the described techniques may equally apply in instances where the users 402 interact with the one or more service provider computers 408 via the one or more user devices 404 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The one or more service provider computers 408 may be configured to, individually or collectively, perform backend functionalities related to behavior-based authentication such as described herein. The functionalities provided by the one or more service providers 408 may be accessible to external devices such as user devices as web-based or cloud-based services, APIs, remote procedural calls, and the like. For instance, the service provider computers 408 may be configured to provide, to the user devices 404, executable code (or script(s)) configured to cause collection of user behavioral information on the user devices 404. The executable code may be executable by the browser application 412 of the user devices 404 or some other applications on the user devices 404. The service provider computers 408 can be configured to provide data and/or functionalities associated with one or more applications. For instance, the service provider computers 408 may be include one or more web servers configured to provide network documents and other content data to the user devices 404 and/or application servers configured to host and enable access to one or more applications. The service provider computers 408 can also be configured to receive and process user behavioral data from user devices 404 so as provide authentication-related services such as described below.

Besides functionalities related to behavior-based authentication, the service provider computers 408 may, in some examples, be configured to provide computing resources such as, but not limited to, client entities, low latency data storage, durable data storage, data access, management, virtualization, cloud-based software solutions, and the like. The one or more service provider computers 408 may also be operable to provide web hosting, computer application development, and/or implementation platforms, combinations of the foregoing, or the like to the one or more users 402.

The one or more service provider computers 408 may include any type of computing devices such as, but not limited to, mainframe servers, web servers, data servers, file servers, desktop computers, portable devices (e.g., laptops, mobile phones, tablet devices), and the like. Additionally, it should be noted that in some embodiments, the one or more service provider computers 408 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 408 may be in communication with the user device 404 via the networks 406, or via other network connections. The one or more service provider computers 408 may include one or more servers, perhaps arranged in a cluster or as individual servers not associated with one another.

In one illustrative configuration, the one or more service provider computers 408 may include at least one memory 420 and one or more processing units or processors(s) 430. The processor(s) 430 may be implemented as appropriate in hardware, computer-executable instructions, firmware, or combinations thereof. Computer-executable instruction or firmware implementations of the processor(s) 430 may include computer-executable or machine-executable instructions written in any suitable programming language to perform the various functions described. The memory 420 may store program instructions that are loadable and executable on the processor(s) 430, as well as data generated during the execution of these programs. Depending on the configuration and type of the one or more service provider computers 408, the memory 420 may be volatile (such as RAM) and/or non-volatile (such as ROM, flash memory, etc.).

In some examples, the service provider computers 408 may also include additional storage 434, which may include removable storage and/or non-removable storage. The additional storage 434 may include, but is not limited to, magnetic storage, optical disks, and/or tape storage. The disk drives and their associated computer-readable media may provide non-volatile storage of computer-readable instructions, data structures, program modules, and other data for the computing devices.

The memory 420 and the additional storage 434, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computers 408. The modules of the service provider computers 408 may include one or more components. The service provider computers 408 may also include input/output (I/O) device(s) and/or ports 432, such as for enabling connection with a keyboard, a mouse, a pen, a voice input device, a touch input device, a display, speakers, a printer, or other I/O device. The service provider computers 408 may also contain communication connection(s) (not shown) that allow the one or more service provider computers 408 to communicate with a data store, another computing device or server, user terminals and/or other devices on the networks 406.

The service provider computers 408 may also include data store 436. The data store 436 may include one or more databases, data structures, or the like for storing and/or retaining information associated with the service provider computers 408. In some examples, the data store 436 may include one or more behavioral data databases 438 used for storing user behavioral data, context information, behavioral pattern data, or any other relevant data. For instance, behavioral data may include access order information with respect to one or more digital objects for one or more users. The digital objects may include applications on a user device or data objects within a specific application (e.g., UI objects, business objects, or database objects). Context information may include timing information, location information, device information, sensor data and any information related to the context or environment in which the behavior data is captured. The information stored in the behavioral data database 438 may include raw data or unprocessed data such as behavior or context data received from the user devices or sensor data from one or more sensors. The information stored in the behavioral data database 438 may also include processed data such as pattern data that is generated based on the raw user behavioral data and/or context data. The processed data may be provided to facilitate efficiency, security, or other goals. For instance, the pattern data may be generated in a format so as to speed up the query and/or comparison of user behavioral data. For example, behavior data may be indexed (e.g., according to context information) so as to generate index files that are easy to search and/or update. As another example, data may be compressed to reduce the size of the data and/or encrypted or encoded to provide security and/or redundancy.

Turning to the contents of the memory 420 in more detail, the memory 420 may include an operating system 428, one or more server applications 421 accessible to the user 402 (e.g., a shopping application), and/or one or more application programs or services for implementing the features disclosed herein including a data analyzer 422, pattern matcher 424, and an authentication engine 426. While these modules and components are illustrated in FIG. 4 and will be described as performing discrete tasks, it is understood that FIG. 4 illustrates example configurations and other configurations performing other tasks and/or similar tasks as those described herein may be implemented according to the techniques described herein. Other modules (not shown) may perform the same tasks as the illustrated modules or other tasks and may be implemented in a similar fashion or according to other configurations. The data analyzer 422 may be configured to receive and process behavioral data from user devices and/or other devices so as to generate behavioral patterns that may be used to authenticate users. The pattern matcher 424 may be configured to match new behavioral data with existing patterns so as to determine whether and/or to what degree the new behavioral data matches with the existing pattern. In some embodiments, the pattern matcher 424 may be configured to generate one or more confidence levels or confidence scores indicating the likelihood that the new behavioral data is generated by the same entity (e.g., user) that is associated with the existing patterns or the risk of fraud. The authentication engine 426 may be configured to provide instructions related to authentication based on the confidence level described above. For example, the instructions may be related to whether authentication is required for an application or a user device, when or a frequency at which such authentication is required, the authentication mechanism to be used, and the like.

In some embodiments, the system 400 may comprise one or more computing services provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

In some embodiments, the user device 404 or the service provider computers 408 may communicate with one or more data stores in order to perform the functionalities described herein. In various embodiments, such data stores may be operably connected to the user devices 404 or the service provider computers 408 locally or remotely via a network. The data stores may include one or more data files, databases (e.g., SQL database), data storage devices (e.g., tape, hard disk, solid-state drive), data storage servers, or the like. In some embodiments, the data stores may comprise one or more storage services provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

It will be appreciated by those of ordinary skill in the art that various embodiments may have fewer or greater number of systems, subsystems, components, and/or subcomponents than are illustrated in FIG. 4 or any other figures herein. Thus, the depiction of the system 400 in FIG. 4 or other figures should be taken as being illustrative in nature and not limiting to the scope of the disclosure. For instance, components, and/or modules for implementing behavior-based authentication that are discussed in FIG. 4 or the functionalities thereof may be implemented by one, two, three, four, or more different devices or system under alternative configurations that are different than that shown in FIG. 4.

Figure 5:
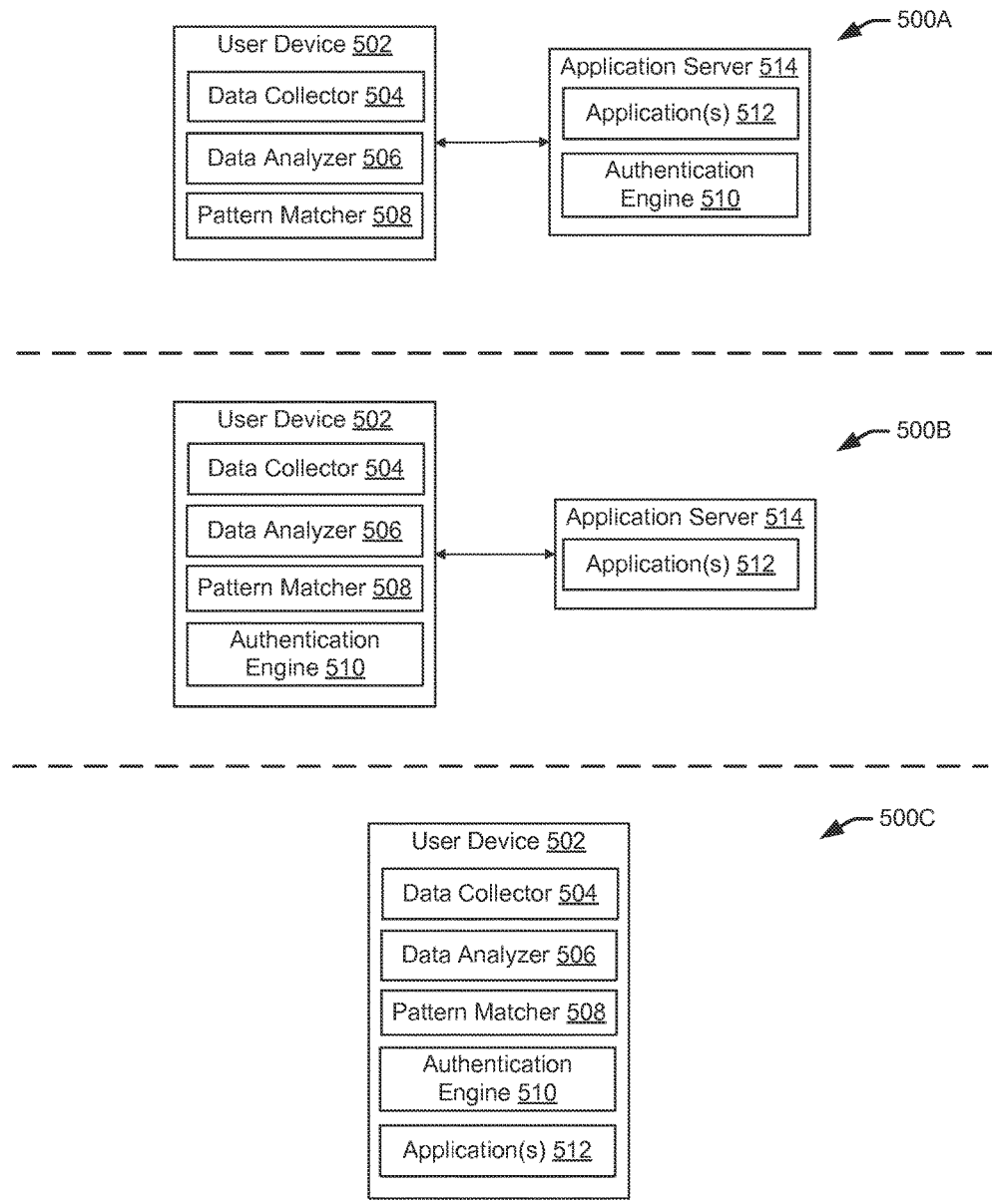
FIG. 5 illustrates some example configurations for the various components for implementing behavior-based authentication, in accordance with embodiments.
Figure 6:
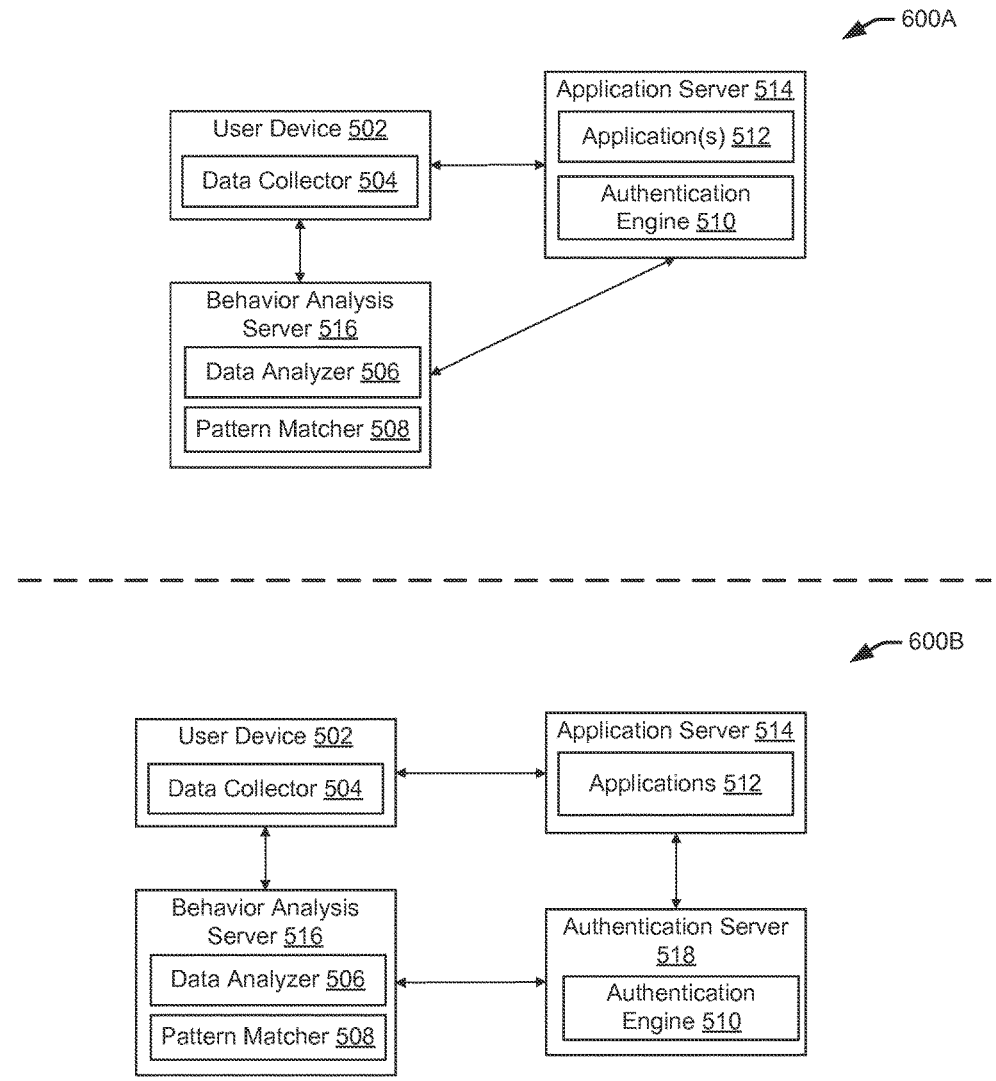
FIG. 6 illustrates some other example configurations for the various components for implementing behavior-based authentication, in accordance with embodiments.

FIGS. 5-6 illustrate some alternative configurations for the various components for implementing behavior-based authentication that are discussed in FIG. 4. The user device 502, data collector 504, data analyzer 506, pattern matcher 508, authentication engine 510, and applications 512 may be similar to the user device 404, behavioral data collector 414, data analyzer 422, pattern matcher 424, authentication engine 426, and applications 421 discussed in FIG. 4. Although shown in FIGS. 5-6 as a single, discrete entity, the user device 502, the application server 514, the behavior analysis server 516, the authentication server 518, and the components contained therein may, in some embodiments, represent multiple devices, systems, subsystems, components, or subcomponents that collective provide the functionalities discussed herein.

In some embodiments, such as illustrated by systems 500A-C of FIG. 5, the behavior-based authentication features may be implemented by the user device 502 and/or an application server 514 in any suitable combination. The application server 514 may be similar to the service provider computer(s) 408 discussed in FIG. 4. For instance, in an embodiment shown in the system 500A, the user device 502 may be configured to implement the data collector 504, data analyzer 506, and pattern matcher 508, whereas the application server 514 may be configured to host and/or implement applications 512 along with the authentication engine 510. In another embodiment shown in the system 500B, the user device 502 may be configured to implement the data collector 504, data analyzer 506, pattern matcher 508, and authentication engine 510, whereas the application server 514 may be configured to only host and/or implement applications 512. In yet another embodiment shown in the system 500C, the user device 502 may be configured to implement all the of the components discussed above including the data collector 504, data analyzer 506, and pattern matcher 508, and authentication engine 510, and applications 512 without requiring an application server.

In some embodiments, such as illustrated by systems 600A-B of FIG. 6, the behavior-based authentication features may be implemented by additional devices or systems. For instance, in an embodiment shown in the system 600A, the data analyzer 506 and the pattern matcher 508 may be implemented by a behavior analysis server 516 that is separate from the user device 502 configured to implement the data collector 504, and the application server 514 configured to host and/or implement applications 512 and the authentication engine 510. In yet another embodiment shown in system 600B, the authentication engine 510 may be implemented by an authentication server 518 that is separate from the behavior analysis server 516 configured to implement the data analyzer 506 and the pattern matcher 508, the user device 502 configured to implement the data collector 504, and the application server 514 configured to host and/or implement applications 512.

In various embodiments, the application server 514, the behavior analysis server 516 and the authentication server 518 may be provided by the same or different service providers and may be part of the same or different computer systems. In some embodiments, the functionalities of the data collector 502, data analyzer 506, pattern matcher 508, and authentication engine 510 may be implemented, individually or collectively, by one or more modules.

Figure 7:
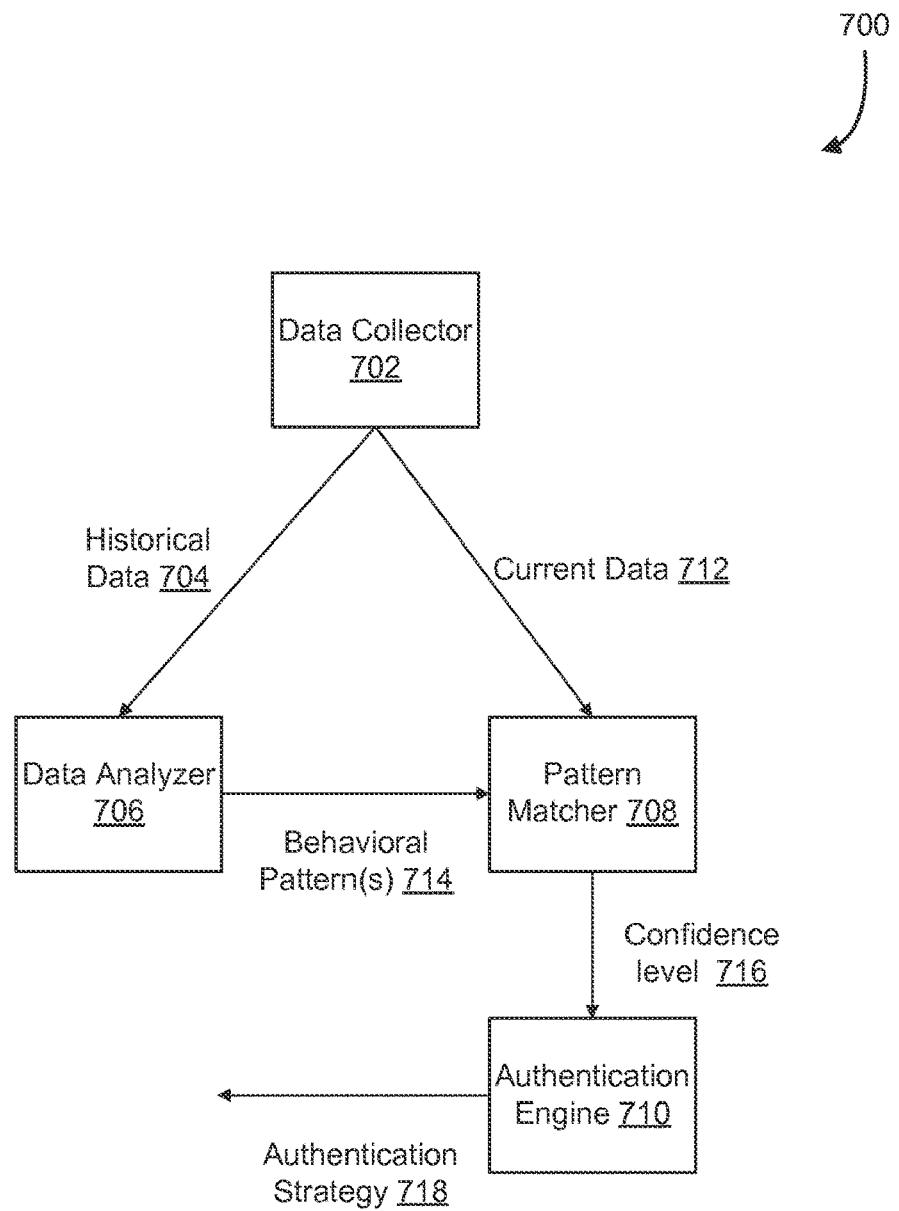
FIG. 7 illustrates example communications between the modules for implementing behavior-based authentication, in accordance with embodiments.

FIG. 7 illustrates example communications 700 between the modules for implementing behavior-based authentication, in accordance with embodiments. The data collector 702, data analyzer 706, pattern matcher 708, and authentication engine 710 may be similar to the data collector, data analyzer, pattern matcher, and authentication engine discussed above in FIGS. 4-6.

As illustrated, the data collector 702 can be configured to provide historical data 704 to the data analyzer 706. The historical data 704 can include historical user behavioral data including order of access information indicating an order in which a user accesses a plurality of digital objects such as applications or data items on a user device or data objects within an application. The historical data 704 can also include historical context information associated with the historical user behavioral data including timing information, location information, device information, and the like. The historical data 704 can be collected during one or more previous application sessions or previous user interactions associated with one or more user accounts for one or more applications. Alternatively or additionally, the historical data 704 can include data indicating user interactions with a user device including an order of access to applications or data installed or stored on the user device. The historical data 704 can be provided by one or more user devices, servers (e.g., application server, web server, data server), sensors, and the like. The historical data 704 can be collected by a client-side process (e.g., browser script), a server-side process (e.g., server script), or a combination of both.

The data analyzer 706 can be configured to process the historical data 704 to generate one or more behavioral patterns 714. In an embodiment, generating the behavioral patterns 714 can include encoding or transforming the historical data using a predefined algorithm (e.g., hashing). The behavioral patterns may be indexed or otherwise categorized according to one or more context categories such as user account, application, device type, time, location, and the like. In some embodiments, the patterns may be categorized according to the type of user behaviors represented by the respective patterns. For example, the behavioral patterns may include an access order pattern (e.g., related to the order of access to UI elements, database objects, device-specific applications, etc.), a navigation speed pattern (e.g., scrolling speed or input speed), a navigation path pattern (e.g., including a series locations within a website or web document where a user traverses), and the like. The patterns may or may not incorporate context information such as time, location, device type, and the like. In various embodiments, any suitable machine learning, pattern recognition, or data mining techniques may be utilized to recognize patterns from the historical data 704 including statistical analysis, artificial neural networks, Bayesian networks, reinforcement learning, and the like.

The behavioral patterns 714 may be provided directly or indirectly to the pattern matcher 708. For instance, the behavioral patterns 714 may be stored in a data store that can be made accessible to the pattern matcher 708 or provided in one or more messages to the pattern matcher 708. The pattern matcher 708 may be configured to match the behavioral patterns 714 with current data 712 to determine a confidence level 716 or confidence score indicating a likelihood that a current user associated with the current data 712 is the intended user. Current data 712 can include current user behavioral data including order of access information indicating an order in which a user currently accesses a plurality of digital objects such as applications or data items on a user device or data objects within an application. The current data 712 can also include current context information associated with the current user behavioral data including timing information, location information, device information, and the like. The current user behavioral data can be collected during an ongoing application session for which a confidence level is to be determined. Alternatively or additionally, the current data 712 can include data indicating current user interactions with a user device including an order of access to applications or data installed or stored on the user device. The current data 712 can be collected by a client-side process (e.g., browser script), a server-side process (e.g., server script), or a combination of both. In some embodiments, the historical data 704 and the current data 712 may be collected by the same or different data collectors 702. For instance, the data collector used to collect the historical data 704 may run on the same or a different device than the data collector used to collect the current data 712.

The pattern matcher 708 may be configured to match the behavioral patterns 714 with current data 712 to determine a confidence level 716 or confidence score. In some embodiments, the pattern matcher 714 is not configured to determine whether there is an exact match between the current data 712 and the behavioral patterns 714. Rather, the pattern matcher 708 can be configured to provide a confidence level indicating the likelihood or probability that there is a match (e.g., using any suitable pattern recognition or machine learning technique). As discussed above, the historical data and/or the behavioral patterns 714 may be indexed according to various context categories. Accordingly, a subset of the historical data and/or behavioral patterns 714 can be selected based on the current context information associated with the current data 712 and used to compare with the current data 712. For instance, where the current data 712 is associated with a specific user account and/or application, the subset of the historical data and/or behavioral patterns 714 associated with the particular user account and/or application may be selected and used to compare with the current data 712. As another example, where the current data 712 may be associated with a particular user device (e.g., as identified by the device's IP address, device identifier, or software/hardware configurations), time period, location, and/or other context categories, the subset of the historical data and/or behavioral patterns 714 associated with those particular context categories may be selected and used to compare with the current data 712. In some embodiments, the current data 712 may be encoded, transformed, or otherwise processed before being compared with the behavioral patterns 714. For instance, a hash may be generated based on some or all portions of the current data 712 and used to compare with the behavioral patterns 714. In some other embodiments, the current data 712 may be compared with behavioral patterns 714 without being transformed. In some embodiments, the current data 712 may also be provided to the data analyzer 706 so as to augment or update existing behavioral patterns. In various embodiments, the confidence level 716 may indicate the likelihood that a current user associated with the current data 712 is the intended user. For example, the confidence level may indicate the likelihood that the current user is the actual user associated with a particular user account for an application or the likelihood that the current user is the actual user associated a particular user account for a user device.

In some embodiments, more than one confidence level or score may be generated. For instance, a particular user may be associated with multiple behavioral patterns respectively associated with a plurality of context categories. A pattern-specific confidence level may be generated for each of some or all of the behavioral patterns and combined to generate an overall confidence level. In some cases, the pattern-specific confidence levels may be weighted in generating the overall confidence level according to relative importance of the patterns. The relative importance of the patterns may vary according to the current context associated with the current behavioral information. Patterns that do not apply or that are of little relevance to the current context may be given 0 or little weight; and vice versa. For instance, a pattern for a desktop device may be given no or little weight compared with a pattern for a tablet device when the current behavioral information is obtained from a tablet device. As another example, a pattern associated with a first time period (e.g., morning) may be given a higher weight than a pattern associated with a second time period (e.g., evening) when the current user behavior is obtained in a time period that overlaps with or is close to the first time period. As yet another example, a pattern for a public place (e.g., airport) may be given a higher weight than a pattern for a private place (e.g., home) when the current user behavior takes place in a public place (e.g., restaurant).

The confidence level 716 may be provided to an authentication engine 710 that is configured to provide an authentication strategy 718 based on the confidence level 716. The authentication strategy 718 may include any instructions related to any aspect of a user authentication including whether authentication is to be requested from a user, when and/or at what frequency authentication is to be requested, type or types of authentication to be requested, and the like. The authentication strategy 718 may be specific to individual or a group of application sessions, processes, services, user accounts, user devices, data objects, and the like. Typically, the higher the confidence that the user associated with the current data 712 is the intended user, the less authentication may be required in terms of the scope, frequency, and/or strength of the authentication. For instance, the authentication may provide protection for a smaller set of objects (e.g., data objects or applications), occur at a lower frequency, and/or take a relatively weak form (e.g., simple username/password authentication as opposed to a three-factor authentication). In an extreme case, the authentication instructions may indicate that no authentication is to be requested at all. On the other hand, the lower the confidence that the user associated with the current data 712 is the intended user, the more authentication may be required. For instance, the authentication may provide protection for a larger set of objects, occur at a higher frequency, and/or take a relatively strong form. In some embodiments, the authentication strategy 718 may be generated based on factors besides the confidence level such as context information including types of user device and/or input device, user profiles, location information, time, and the like. For instance, given the same confidence score, different types of authentication may be requested based on the above factors. An authentication method requiring a user's biometric identifier (e.g., finger print, retinal pattern, voice) may be requested for a user device that is equipped with a biometric device (e.g., finger print reader, retina reader, microphone); whereas an authentication method that does not require the user's biometric identifier (e.g., a user/password authentication) may be requested for a user device that is not equipped with a biometric device. In some other examples, authentication methods may be different between a mobile user device (e.g., smartphones or tablet devices) and a desktop computer, different input devices (e.g., touchscreen versus mouse and keyboard), different software and/or hardware configurations (e.g., operating system), different perceived levels of device security, and the like. In some embodiments, some or all of the above considerations may be also used to determine the confidence level 716.

In some embodiments, the authentication instructions may be provided to the user devices, application servers, web servers, or a third-party entity to cause a course of action that corresponds to the authentication instructions. For instance, the authentication instructions may cause a process running on an application server to request authentication for accessing features associated with an ongoing application session. As another example, the authentication instructions may cause a process running on a user device to request user authentication for accessing a portion of a user device. In some embodiment, the authentication instructions can include data for presenting an authentication user interface (e.g., an authentication form to be rendered in a web browser, an authentication screen to be provided on a user device, and the like). In some embodiments, the authentication instructions may include additional information such as warning or error messages.

In some embodiments, the techniques described above for authenticating users can be used to detect fraudulent activities. For instance, a low confidence level 716 may indicate a deviation from existing user behavior and hence potentially fraudulent activities. In some embodiments, the current data 712 may be compared with fraud behavioral patterns that are associated with known fraud behaviors. The fraud behavior patterns may be provided directly or indirectly by the data analyzer 706 based on historical data 704 that includes fraud behavioral data associated with fraudulent activities. Alternatively or additionally, the fraud behavioral patterns and/or the fraud behavioral data may be provided by a third-party entity such as an Intrusion Detection System (IDS) or Intrusion Prevention System (IPS). When used for fraud detection purposes, warnings or error messages, log files, or other data may be provided as a result of the fraud detection.

Figure 8:
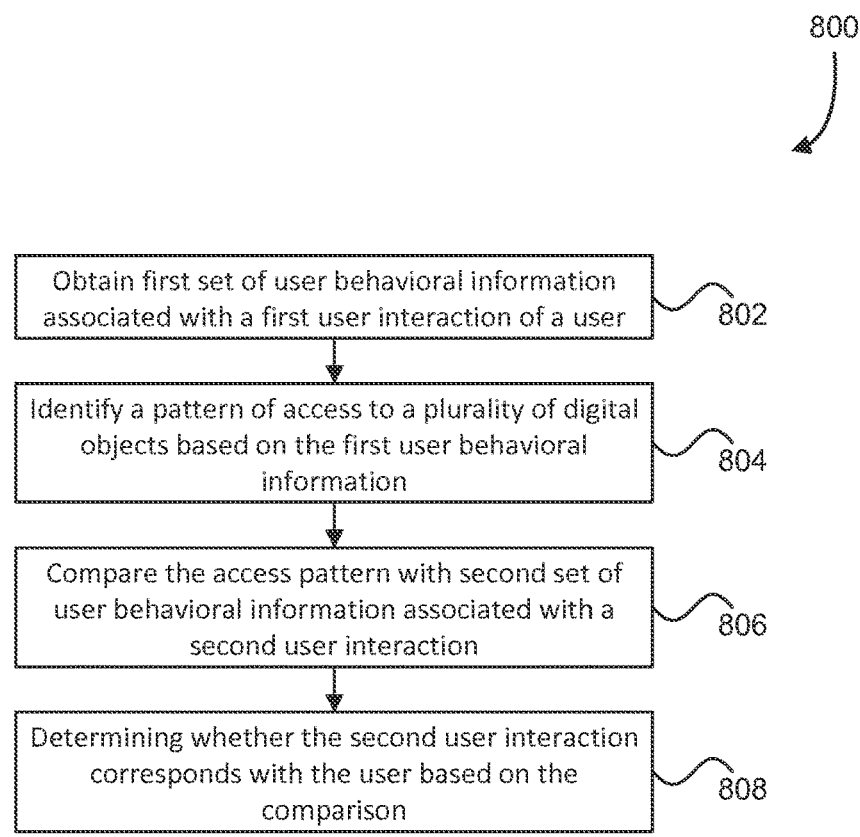
FIG. 8 illustrates an example process for implementing behavior-based authentication, in accordance with embodiments.

FIG. 8 illustrates an example process 800 for implementing behavior-based authentication, in accordance with embodiments. Aspects of the process 800 may be performed, individually or in combination, by a user device, a service provider computer, or other servers such as discussed in connection with FIGS. 4-6. Some or all aspects of the process 800 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

The process 800 includes obtaining 802 first user behavioral information associated with a first user interaction. The first user behavioral information may be collected by a user device based on a first user's interaction with the user device, and/or collected by a server device with which the user device communicates. In some embodiments, the first user behavioral information may be collected during one or more application sessions associated with one or more local or remote applications. Alternatively or additionally, the first user behavioral information may be collected during a user's previous access to one or more objects stored on the user device. The collection of the first user information may be performed, individually or collectively, by one or more processes running on the user device (e.g., client-side script, browser-script) and/or a remote device (e.g., server-script). The first user interaction may span an arbitrary period of time. In some embodiments, the first user interaction may be associated with a known and/or trusted user. For instance, the first user interaction may have occurred shortly after a verified user authentication and/or within a relatively secure environment (e.g., at a private location such as home).

A pattern of access to a plurality of digital objects may be identified 804 based on the first user behavioral information. The plurality of digital objects may include a plurality of applications installed on a user device, a plurality of data objects stored on a user device, a plurality of objects (e.g., UI objects, business objects, or database objects) associated with a specific application, a plurality features or services provided by a system, or the like. The pattern of access may include an access order with which some or all of the digital objects are accessed by the first user. For instance, the access order may indicate an order in which applications on the user device are launched or accessed by the user or an order in which data objects stored on the user device are accessed by the user. Alternatively, the access order may indicate an order in which data specific to an application (e.g., UI elements, backend data objects, memory locations) are accessed, directly or indirectly, by the user. For example, a user may interact with UI elements directly via a user interface and interact indirectly with the underlying backend data objects via the user interface. In some embodiments, access patterns can also include frequency, duration, type of access (e.g., read or write), and other characteristics related to access of information.

In some embodiments, the access pattern can be generated based on multiple access orders all associated with the same user. For instance, a first access order may be "1-2-3-4" whereas a second access order may be "1-3-2-4." The access pattern based on the first access order and the second access order may be "1-*-4" indicating that "1" is the first object accessed and "4" is the last object accessed. More than one access pattern may be generated. For instance, based on the above access orders, access patterns indicating the relative positions between the objects may be generated such as "2-4" indicating that "2" is accessed before "4" and "1-3" indicating that "1" is accessed before "3". In some embodiments, the access patterns may be generated by encoding or transforming the user behavioral data to improve efficiency. For example, the access patterns may include a hash based on the user behavioral data to speed up queries and save space. Furthermore, the access pattern may be periodically or continuously updated, when necessary, as new user behavioral information is received and processed. In various embodiments, any suitable machine learning techniques may be utilized to identify access patterns or any other user behavioral patterns based on the first user behavioral information.

In some embodiments, context information may be collected or recorded as part of or in addition to user behavioral information. Context information may include any information related to an environment within which the user behaviors take place such as user account, application identifier, device identifier, device characteristics, time, location, and the like. In various embodiments, the context information may be used to select particular access patterns. For instance, the access patterns may incorporate context information along with the user behavioral information. Or, access patterns may be categorized according to one or more context categories identified from the context information. In some embodiments, the access patterns may incorporate some or all of the context information. For instance, the access patterns can include time, location, device type, and other context information.

The access pattern may be compared 806 with second user behavioral information associated with a second user interaction. The second user behavioral information may be collected in a similar manner as the collection of the first user behavioral information. In some embodiments, the second user may be using the same account identifier (e.g., for an application or a device) and/or the same user device as the first user. In other embodiments, the second user may not be using the same account identifier and/or user device as the first user. The second user interaction may span an arbitrary period of time. In some cases, the second user interaction may occur after the first user interaction discussed above. In other cases, the second user interaction may occur substantially concurrently with the first user interaction (e.g., at different devices and/or in different applications). In yet other cases, the second user interaction may occur before the first user interaction. In some embodiments, the second user interaction may be associated with an unknown or suspicious user. For instance, the second user interaction may have occurred relatively long after a verified user authentication and/or within a relatively insecure environment (e.g., at a public location such as a restaurant). The comparison between the first access pattern of the first user and the second user behavioral information of the second user may include identifying a second access pattern associated with the second user and comparing the first access pattern of the first user with the second access pattern of the second user. Any suitable pattern matching or pattern recognition techniques may be used during the comparison including statistical analysis, fuzzy logic, artificial neural networks, and the like.

Based on the comparison above, it may be determined 808 whether the second user interaction corresponds with the known user. In some embodiments, the result of the determination may include a Boolean value of "True" or "False". In other embodiments, the result may include a probabilistic value such as a confidence score or level that indicates the likelihood that the unknown user associated with the second user interaction is or is not the known user.

The result determined at step 808 may be used to determine an authentication strategy. In various embodiments, the authentication strategy may include determining whether to request authentication, increasing or decreasing a frequency of authentication, increasing or decreasing a strength of authentication, or selecting an authentication scheme from a plurality of authentication schemes (e.g., a two-factor authentication scheme or a three-factor authentication scheme, a biometric-based authentication scheme or a username/password authentication scheme). For example, the confidence level may be used to determine authentication instructions discussed above. In an embodiment, when the confidence level exceeds a predetermined threshold (e.g., 95%), it may be determined that no additional authentication is required. On the other hand, when the confidence level does not exceed a predetermined threshold (e.g., 95%), it may be determined that additional authentication is required from the second user. Additionally, where authentication is required, a type, scope, frequency, strength, and other characteristics of the authentication method may be determined based at least in part on the confidence level. In an embodiment, the confidence level may be compared with a plurality of tiered threshold values and depending on where the confidence level falls with respect to the tiered threshold values, a suitable authentication method may be selected from a plurality of authentication methods. For instance, a first authentication method may be selected for a confidence level that is above 75% but less than or equal to 95%, a second authentication method may be selected for a confidence level that is above 55% but less than or equal to 75%, and a third authentication method may be selected for a confidence level that is less than or equal to 55%. The scope, strength, and/or frequency of the authentication methods may increase for the third authentication method compared with the second authentication method, and for the second authentication method compared with the first authentication method. In some embodiments, the generation of authentication instructions and/or the selection of the authentication methods may additionally depend on other factors such as device type, time, location information, and the like. For instance, a stronger form of authentication may be requested given the same confidence level when the user device is in a public setting (e.g., restaurant or airport) than when the user device is in a private or semi-private setting (e.g., home or office).

Similar techniques can be used to detect fraudulent activities. For example, if the confidence level falls below a predetermined threshold value (e.g., 30%), it may be determined that the second user is performing fraudulent activities. In another example, the second user behavioral information may be compared with known behavioral information or patterns associated with fraud activities. For instance, the behavioral patterns associated with known fraudulent activities may include accessing sensitive data or applications at a heightened priority and/or frequency. If there is a match between the second user interaction and the known fraudulent behavioral information (e.g., the confidence level exceeding a predetermined threshold value), then it may be determined that the second user is performing fraudulent activities. In response to the detection of fraud, appropriate fraud prevention or mitigation measures may be taken including rendering inaccessible, in portion or as a whole, a device, application, a computation resource (e.g., network connection, memory, CPU), a network resource (e.g., website), a data set, or any other objects previously accessible to the second user. In some embodiments, rendering inaccessible an object may include blocking access to the object (e.g., using a blacklist), erasing the object, or marking the object as erased.

Figure 9:
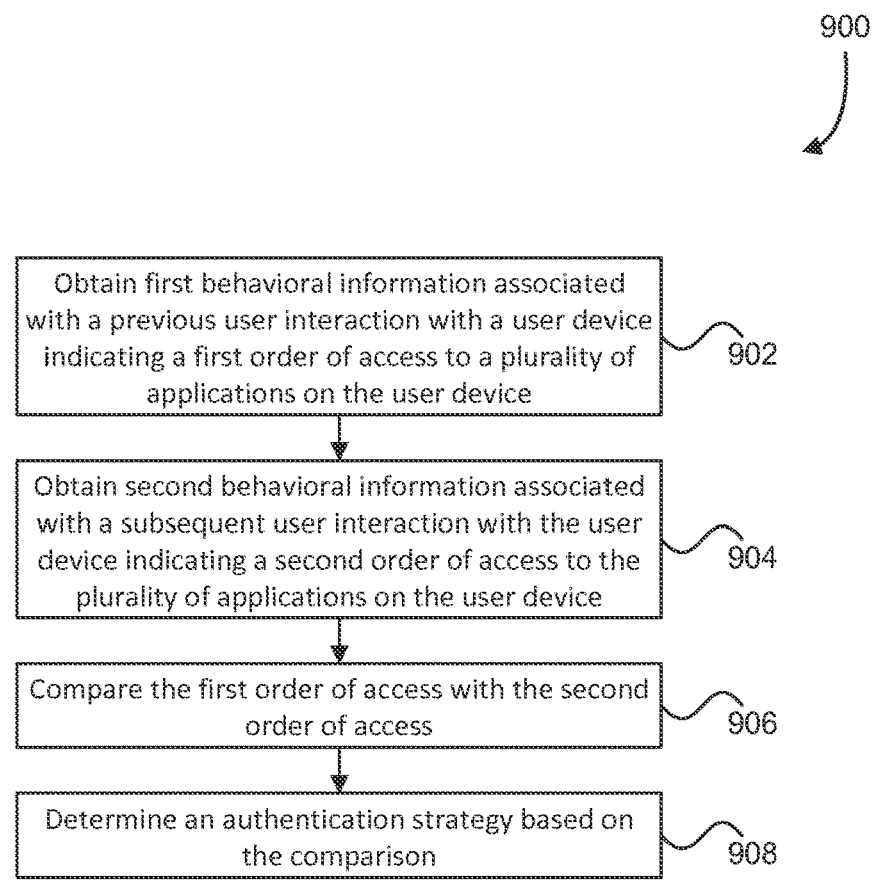
FIG. 9 illustrates an example process for implementing behavior-based authentication for user devices, in accordance with embodiments.

FIG. 9 illustrates an example process 900 for implementing behavior-based authentication for user devices, in accordance with embodiments. In some embodiments, the process 900 can be used to determine whether to request authentication from a user of a user device such as that illustrated in FIG. 2. Aspects of the process 900 may be performed individually or collectively by a user device, a service provider computer, or other servers such as discussed in connection with FIGS. 4-6.

The process 900 can include obtaining 902 a first set of behavioral information associated with one or more previous user interactions with a user device. Such previous user interactions can be associated with a first user. The first user may be considered known and/or authenticated. The first set of behavioral information can indicate a first order of access to a plurality of applications on the user device such as discussed in connection with FIG. 2. The first set of behavioral information may incorporate or be correlated with context information to generate behavioral patterns that represent the first order of access.

Subsequently, a second set of behavioral information associated with one or more subsequent user interactions with the user device may be obtained 904. The subsequent user interactions may be associated with an unknown user or a user whose identity is unclear. The second set of behavioral information may indicate a second order of access to the plurality of applications on the user device. The first set of behavioral information may be compared with the second set of behavioral information to determine whether the subsequent user interactions are associated with the first known user. Specifically, the first order of access may be compared 906 with the second order of access (e.g., using any suitable pattern matching or pattern recognition techniques). In some embodiments, the first set of behavioral information and the second set of behavioral information may be compared directly. In other embodiments, the first set of behavioral information and/or the second set of behavioral information may be processed before being compared with each other. For instance, a first set of behavioral patterns may be generated based on the first set of behavioral information and used to compare with the second set of behavioral information. As another example, a second set of behavioral patterns may be generated based on the second set of behavioral information and compared with the first set of behavioral patterns. In an embodiment, a subset of the first set of behavioral information (including patterns thereof) is selected and only the selected subset of the first set of behavioral information is compared with the second set of behavioral information. The selection of the subset of the first set of behavioral information (including patterns thereof) may be based on context information associated with the second set of behavioral information such as time, location, device type, and the like.

Finally, the process 900 can include determining 908 an authentication strategy based at least in part on the result of the comparison. Determining the authentication strategy may include determining whether to request authentication, increasing or decreasing a frequency of authentication, increasing or decreasing a strength of authentication, and/or selecting an authentication scheme from a plurality of authentication schemes. The comparison may render a confidence score or confidence level indicating the likelihood that the subsequent user interactions with the user device are associated with the first known user. In an example, such determination may be based on a comparison of a confidence level with a threshold value such as discussed at step 808 of the process 800 in FIG. 8. If it is determined that authentication is to be requested, the second user may be presented with an authentication user interface (e.g., a login screen) for the user device or a portion thereof. In some embodiments, the process 900 may also include determining how to authenticate the second user such as discussed at step 808 of the process 800 in FIG. 8.

Figure 10:
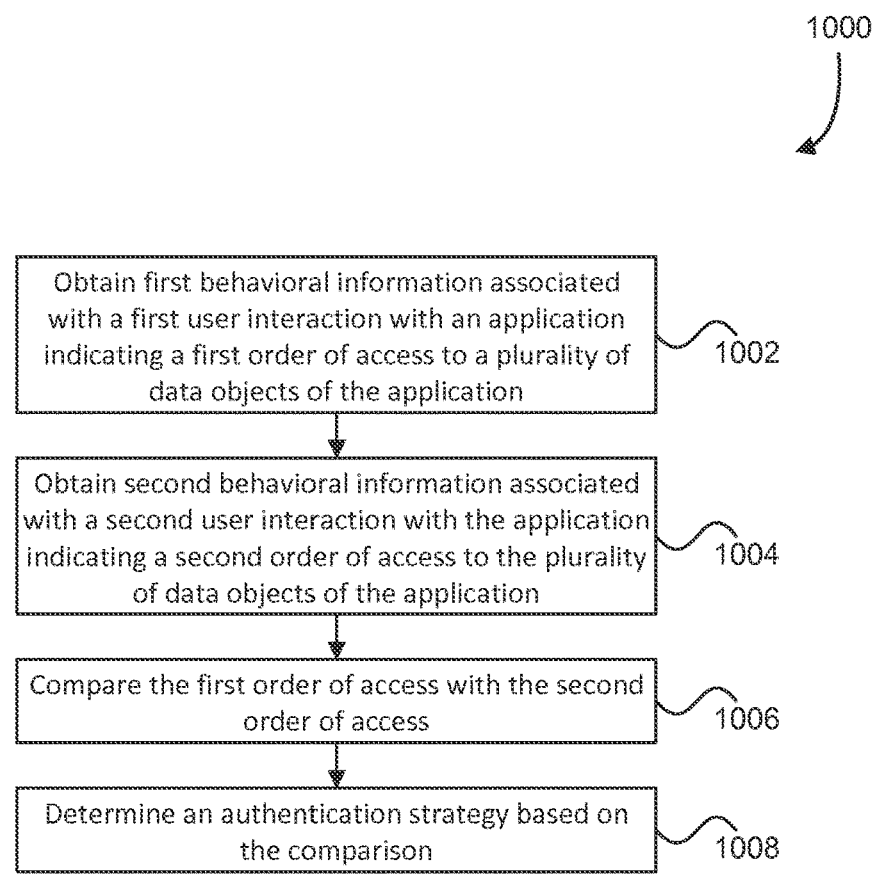
FIG. 10 illustrates an example process for implementing behavior-based authentication for application sessions, in accordance with embodiments.

FIG. 10 illustrates an example process 1000 for implementing behavior-based authentication within an application, in accordance with embodiments. In some embodiments, the process 1000 can be used to authenticate users of local or web-based applications such as the shopping application discussed in FIG. 3. Aspects of the process 1000 may be performed individually or collectively by a user device, a service provider computer, or other servers such as discussed in connection with FIGS. 4-6.

The process 1000 can include obtaining 1002 a first set of behavioral information associated with one or more previous user interactions with an application. Such previous user interactions can be associated with a first user. The first user may be considered known and/or authenticated. The first set of behavioral information can indicate a first order of access to a plurality of data objects of the application such as UI objects, business objects, database objects, and the like such as discussed in connection with FIG. 3. The first set of behavioral information may incorporate or be correlated with context information to generate behavioral patterns that represent the first order of access.

Subsequently, a second set of behavioral information associated with one or more subsequent user interactions with the application may be obtained 1004. The subsequent user interactions may be associated with an unknown user or a user whose identity is unclear. The second set of behavioral information may indicate a second order of access to the plurality of data objects associated with the application. The first set of behavioral information may be compared with the second set of behavioral information to determine whether the subsequent user interactions are associated with the first known user. Specifically, the first order of access may be compared 1006 with the second order of access (e.g., using any suitable pattern matching or pattern recognition techniques). In some embodiments, the first set of behavioral information and the second set of behavioral information may be compared directly or indirectly as discussed above in connection with step 906 of the process 900 in FIG. 9. In an embodiment, a subset of the first set of behavioral information (including patterns thereof) is selected and only the selected subset of the first set of behavioral information is compared with the second set of behavioral information. The selection of the subset of the first set of behavioral information (including patterns thereof) may be based on context information associated with the second set of behavioral information such as time, location, device type, and the like. In some embodiments, the comparison may render a confidence score or confidence level indicating the likelihood that the first user and the second user are the same user or that the first user and the second user are not the same user.

Finally, the process 1000 can include determining 1008 an authentication strategy based at least in part on the result of the comparison. Determining the authentication strategy may include determining whether to request authentication, increasing or decreasing a frequency of authentication, increasing or decreasing a strength of authentication, and/or selecting an authentication scheme from a plurality of authentication schemes. The comparison may render a confidence score or confidence level indicating the likelihood that the subsequent user interactions with the application are associated with the first known user. In an example, such determination may be based on a comparison of a confidence level with a threshold value such as discussed at step 908 of the process 900 in FIG. 9. If it is determined that authentication is to be requested, the second user may be presented with an authentication user interface (e.g., a login page) within the application. In some embodiments, the process 1000 may also include determining how to authenticate the second user such as discussed at step 908 of the process 900 in FIG. 9.

Figure 11:
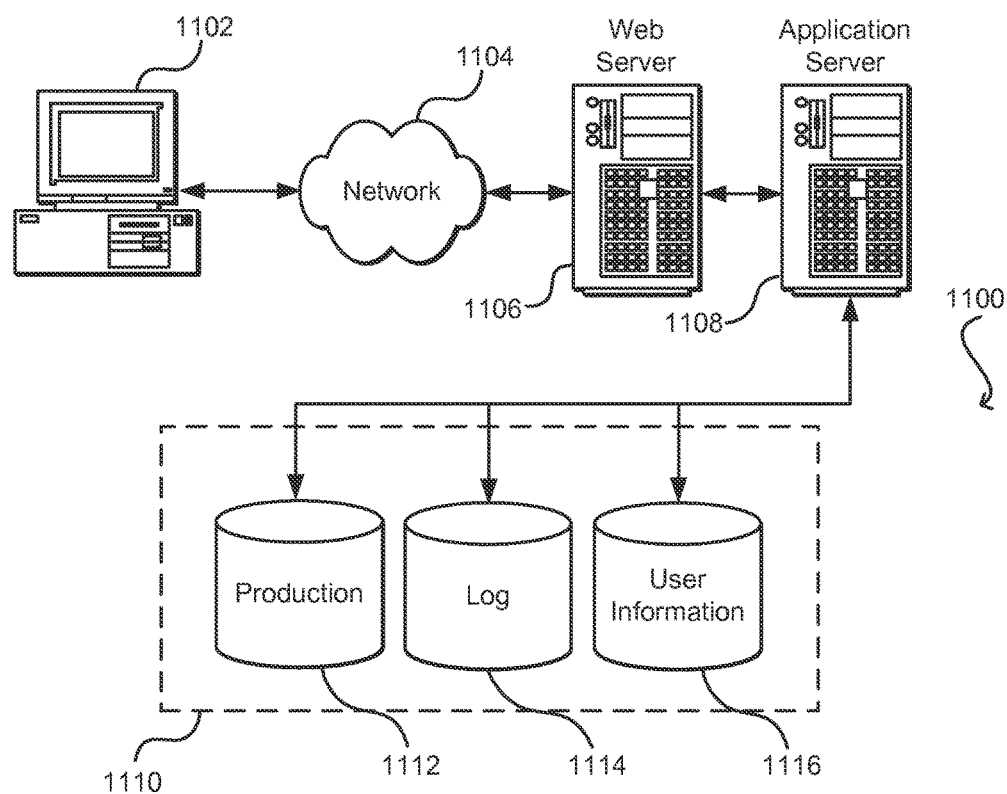
FIG. 11 illustrates aspects of an example environment for implementing aspects in accordance with various embodiments.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer system for providing user authentication, comprising:
    one or more processors; and
    memory, including instructions executable by the one or more processors to cause the computer system to at least:
    collect historical behavioral information associated with a first user interaction of a user with one or more applications, the historical behavioral information indicating a first sequence for an order of access by the user with one or more user interface objects specific to an application of the one or more applications that includes a first sequence for an order of user-provided input for the one or more user interface objects and the historical behavioral information including a time when the application is accessed, a type of user device used to access the application, and a location of the user device when the application is accessed;
    identify one or more historical behavioral patterns associated with the first user interaction based at least in part on the historical behavioral information, the one or more historical behavioral patterns indicating the first sequence for the order of access by the user with the one or more user interface objects specific to the application;
    collect current behavioral information associated with a second user interaction with the application, the current behavioral information indicating a second sequence for an order of access by the user with the one or more user interface objects specific to the application that includes a second sequence for an order of user-provided input for at least one of the one or more user interface objects;

compare the current behavioral information associated with the second user interaction with the one or more historical behavioral patterns associated with the first user interaction comprising comparing the first sequence for the order of access with the second sequence for the order of access, wherein the first sequence for the order of access is different from the second sequence for the order of access based at least in part on a presence or absence of a user interface object of the one or more user interface objects between the first sequence for the order of access and the second sequence for the order of access;

determine a confidence level indicating a likelihood that the second user interaction is associated with the user based at least in part on the comparison of the current behavioral information with the one or more historical behavioral patterns;

determine an authentication strategy that includes at least one of determining whether to request authentication, increasing or decreasing a frequency of authentication, increasing or decreasing a strength of authentication, or selecting an authentication scheme from a plurality of authentication schemes;

request authentication information using a specific authentication scheme from the user based at least in part on device information and the confidence level being below a threshold, the device information identifying the type of user device utilized by the user to access the application; and restrict access to a portion of the computer system that was previously accessible based at least in part on a response to the request for the authentication information and the specific authentication scheme.

2. The computer system of claim 1, wherein comparing the current behavioral information associated with the second user interaction with the one or more historical behavioral patterns associated with the first user interaction comprises selecting a subset of the one or more historical behavioral patterns based at least in part on context information associated with the current behavioral information and comparing the current behavioral information with the selected subset of the one or more historical behavioral patterns.

3. A computer-implemented method for providing user authentication, comprising:

obtaining a first set of user behavioral information associated with a first user indicating a first sequence for an order of access by the user with one or more user interface objects specific to an application installed on a user device accessible via a user interface provided by the application that includes a first sequence for an order of user-provided input for the one or more user interface objects and the first set of user behavioral information including a time when the application is accessed, a type of the user device used to access the application, and a location of the user device when the application is accessed;

obtaining a second set of user behavioral information indicating a second sequence for an order of access to the one or more user interface objects specific to the application that includes a second sequence for an order of user-provided input for the one or more user interface objects;

determining a confidence level indicating a likelihood that the second set of user behavioral information is associated with the first user based at least in part on comparing the first set of user behavioral information with the second set of user behavioral information, wherein the first set of user behavioral information is different from the second set of user behavioral information based at least in part on a presence or absence of a user interface object of the one or more user interface objects between the first sequence for the order of access and the second sequence for the order of access;

determining an authentication strategy that includes at least one of determining whether to request authentication, increasing or decreasing a frequency of authentication, increasing or decreasing a strength of authentication, or selecting an authentication scheme from a plurality of authentication schemes;

requesting authentication of the user utilizing a two-factor authentication scheme selected from a plurality of authentication schemes based at least in part on device information of the user device and the confidence level being below a threshold, the device information identifying the type of the user device; and restricting access to a portion of the user device that was previously accessible based at least in part on a response to the request for authentication of the user utilizing the two-factor authentication scheme.

4. The computer-implemented method of claim 3, wherein the first set of user behavioral information is obtained from one or more previous user interactions with the application and the second set of user behavioral information is obtained from an ongoing user interaction with the application.

5. The computer-implemented method of claim 3, wherein a first subset of the first set of user behavioral information and a second subset of the second set of user behavioral information are obtained from one single application session.

6. The computer-implemented method of claim 5, wherein the first set of behavioral information associated with the first user indicating the first sequence for the order of access further includes one or more data objects installed on the user device, the one or more data objects comprising at least one of database objects, files, or storage locations.

7. The computer-implemented method of claim 3, wherein determining the confidence level further comprises comparing the second set of user behavioral information with a third set of user behavioral information associated with known fraudulent activities.

8. The computer-implemented method of claim 3, further comprising identifying one or more behavioral patterns based on the first set of user behavioral information and wherein comparing the first set of user behavioral information with the second set of user behavioral information comprises comparing the one or more behavioral patterns with the second set of user behavioral information.

9. The computer-implemented method of claim 8, further comprising selecting a behavioral pattern from the one or more behavioral patterns based at least in part on context information associated with the second set of behavioral information and comparing the selected behavioral pattern with the second set of user behavioral information.

10. The computer-implemented method of claim 9, wherein the context information associated with the second set of user behavioral information includes at least one of a time period, a device type, or a location.

11. The computer-implemented method of claim 3, further comprising selecting an authentication scheme from the plurality of authentication schemes for authenticating a user associated with the second set of user behavioral information based at least in part on the confidence level.

12. One or more non-transitory computer-readable storage media having stored thereon executable instructions for providing user authentication that, when executed by one or more processors of a computer system, cause the computer system to perform operations comprising:
- obtaining historical behavioral information associated with a user based on one or more previous user interactions with an application, the historical behavioral information indicating a sequence for an order of access by the user with a plurality of user interface objects specific to the application via a user interface that includes a first sequence for an order of user-provided input for the plurality of user interface objects and the historical behavioral information including a time when the application is accessed, a type of a user device used to access the application, and a location of the user device when the application is accessed;
- identifying an access pattern to the plurality of user interface objects based at least in part on the historical behavioral information, the access pattern indicating the sequence for the order of access by the user with the plurality of user interface objects specific to the application;
- comparing the identified access pattern with current behavioral information based on one or more current user interactions with the application, the current behavioral information indicating a second sequence for the order of user-provided input for the plurality of user interface objects, wherein the identified access pattern is different from the current behavioral information based at least in part on a presence or absence of a user interface object of the plurality of user interface objects between the first sequence for the order of user-provided input and the second sequence for the order of user-provided input;
- determining a confidence level indicating a likelihood that the current behavioral information is associated with the user based at least in part on the comparison;
- determining an authentication strategy that includes at least one of determining whether to request authentication, increasing or decreasing a frequency of authentication, increasing or decreasing a strength of authentication, or selecting an authentication scheme from a plurality of authentication schemes;
- requesting biometric authentication from the user based at least in part on device information and the determined confidence level being below a threshold, the device information identifying the type of user device utilized by the user to interact with the application; and
- restricting access to a portion of the computer system that was previously accessible based at least in part on a response to the request for biometric authentication.

13. The one or more non-transitory computer-readable storage media of claim 12, wherein the access pattern comprises a frequency of access to the plurality of user interface objects.

14. The one or more non-transitory computer-readable storage media of claim 12, wherein the sequence for the order of access to the plurality of user interface objects comprises an order of read and write operations for the plurality of user interface objects.

15. The one or more non-transitory computer-readable storage media of claim 12, wherein comparing the identified access pattern with the current behavioral information comprises:
- identifying a second sequence for an order of access pattern to the plurality of user interface objects based at least in part on the current behavioral information; and
- comparing the identified access pattern with the second access pattern.

16. The one or more non-transitory computer-readable storage media of claim 12, wherein the executable instructions cause the computer system to perform operations further comprising determining a frequency or a strength of an authentication method to be used for authenticating a user associated with the current behavioral information based at least in part on the confidence level.

* * * * *